April 5, 1927.
C. F. KETTERING
CONTROL APPARATUS
Filed Aug. 25, 1919
24 Sheets-Sheet 13
1,623,121
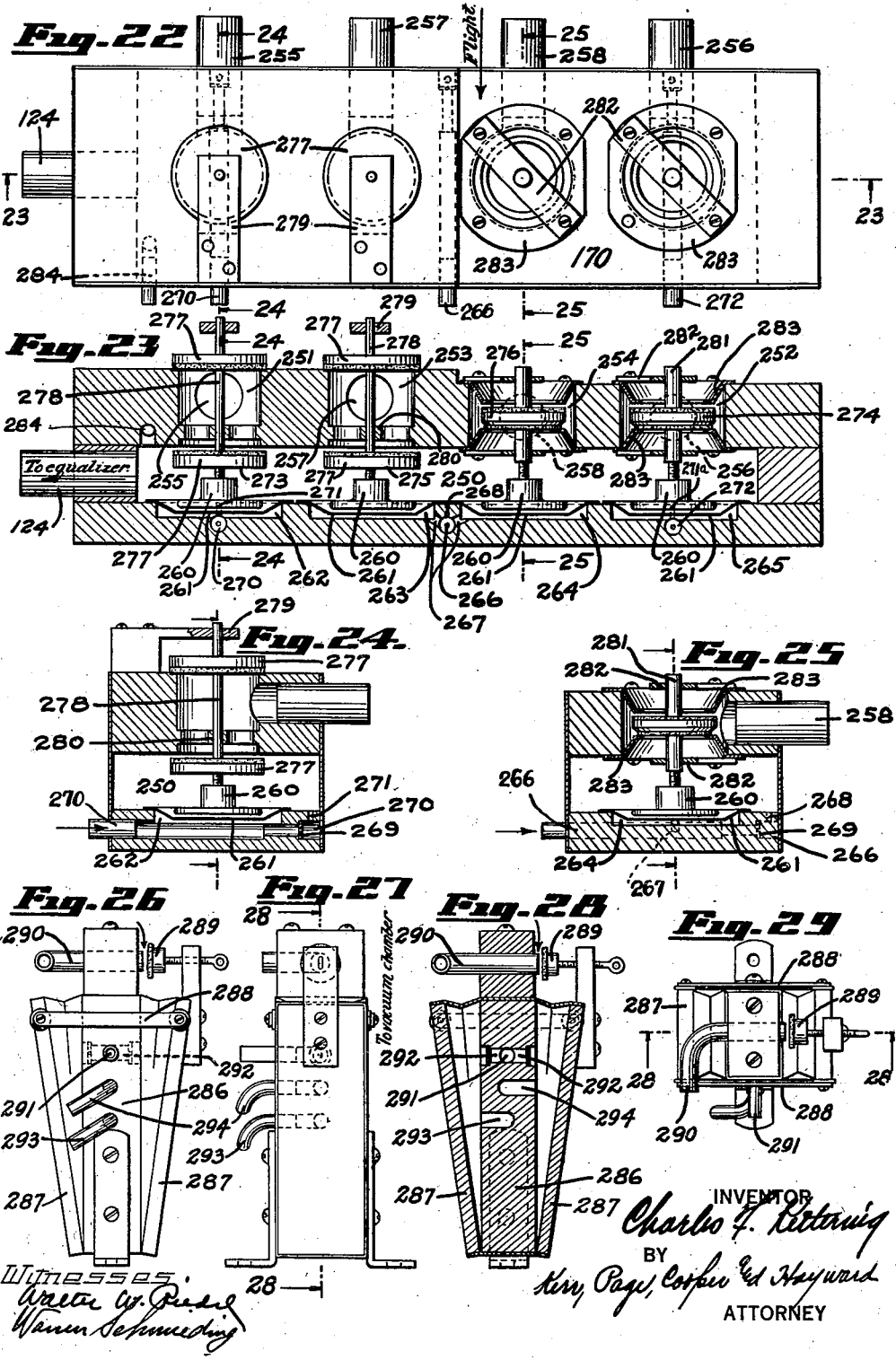
INVENTOR
Charles F. Kettering
BY
Kerr, Page, Cooper and Hayward
ATTORNEY
Witnesses:
Walter W. Riedel
Warren Schmieding

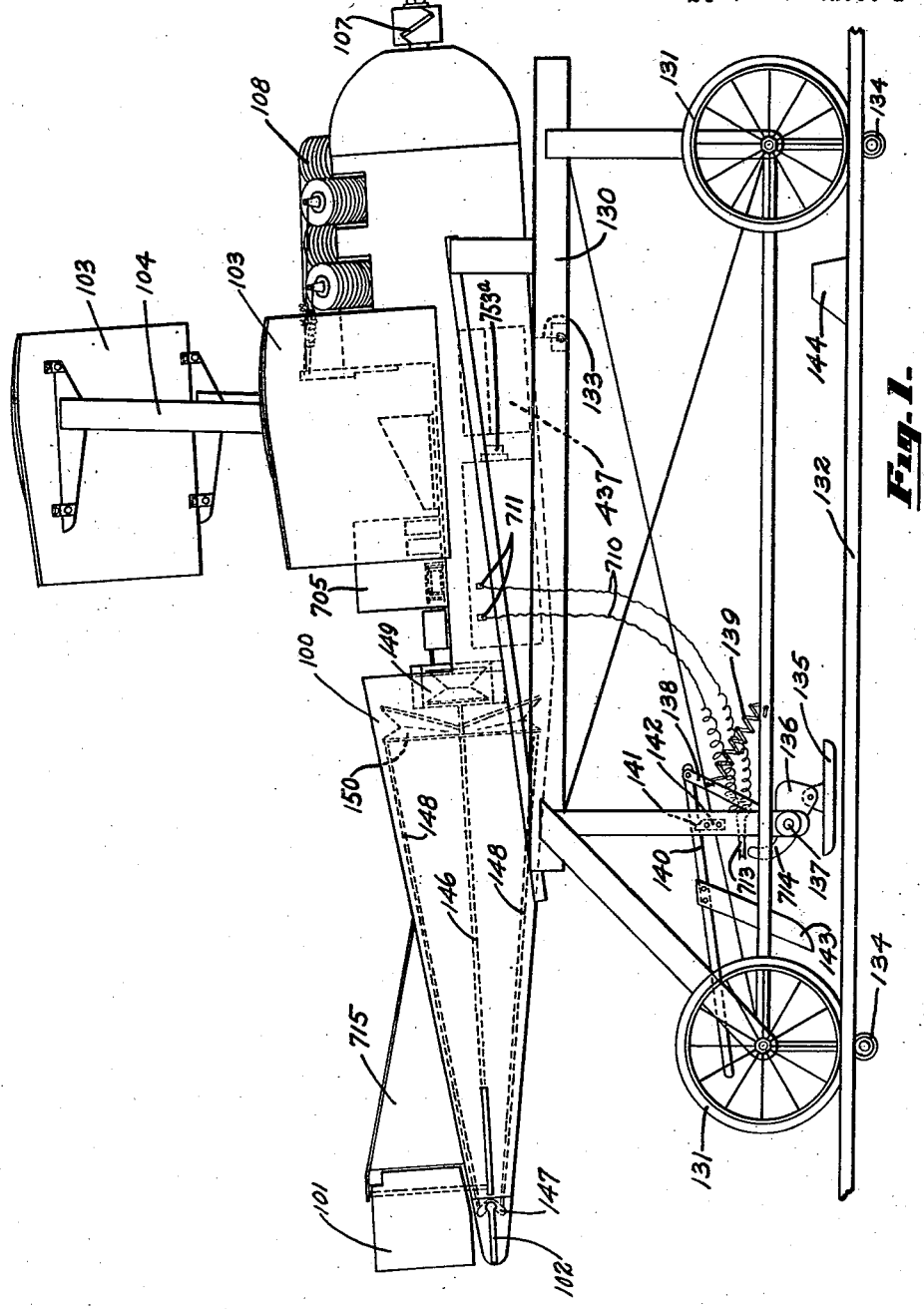

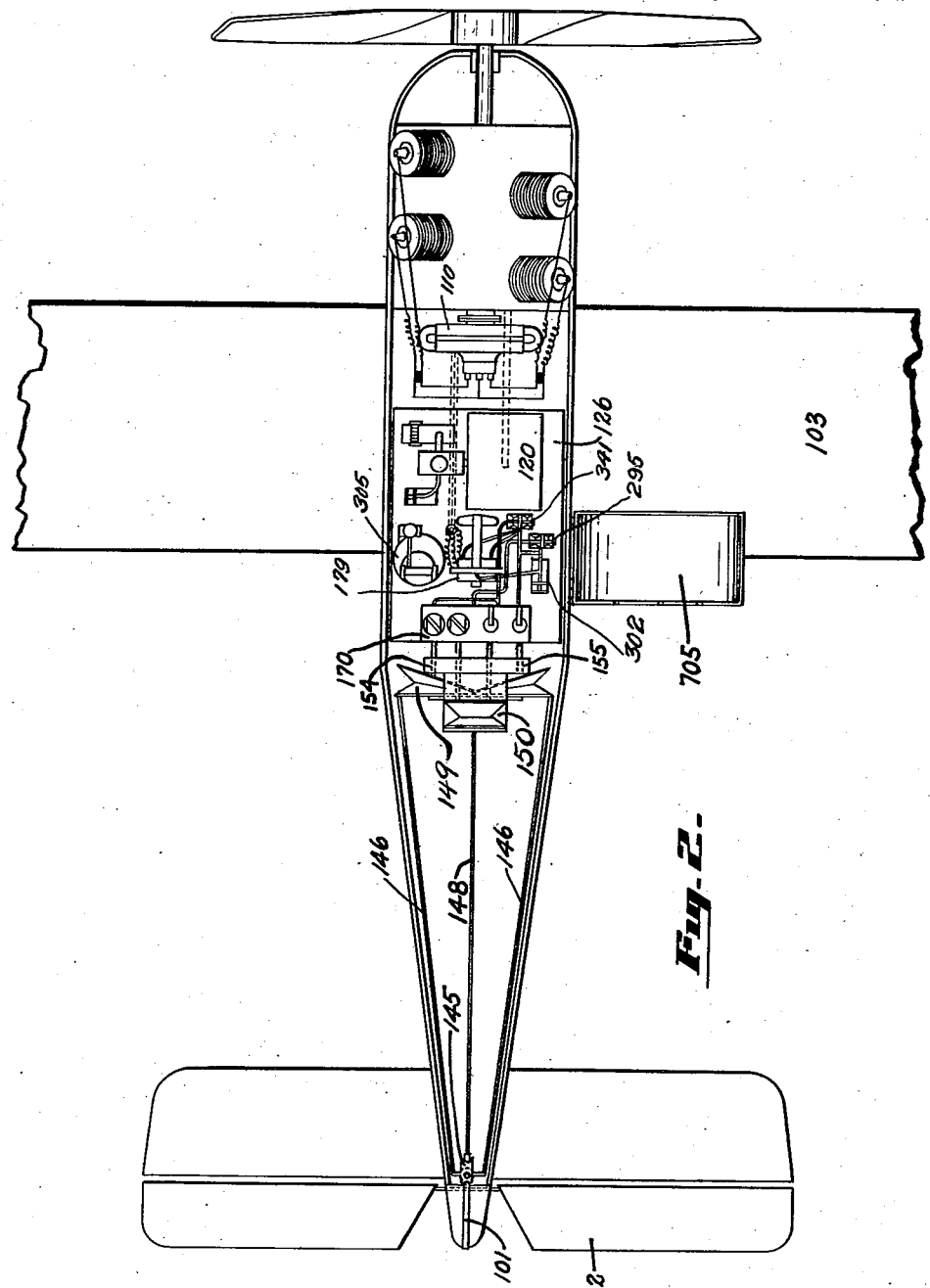

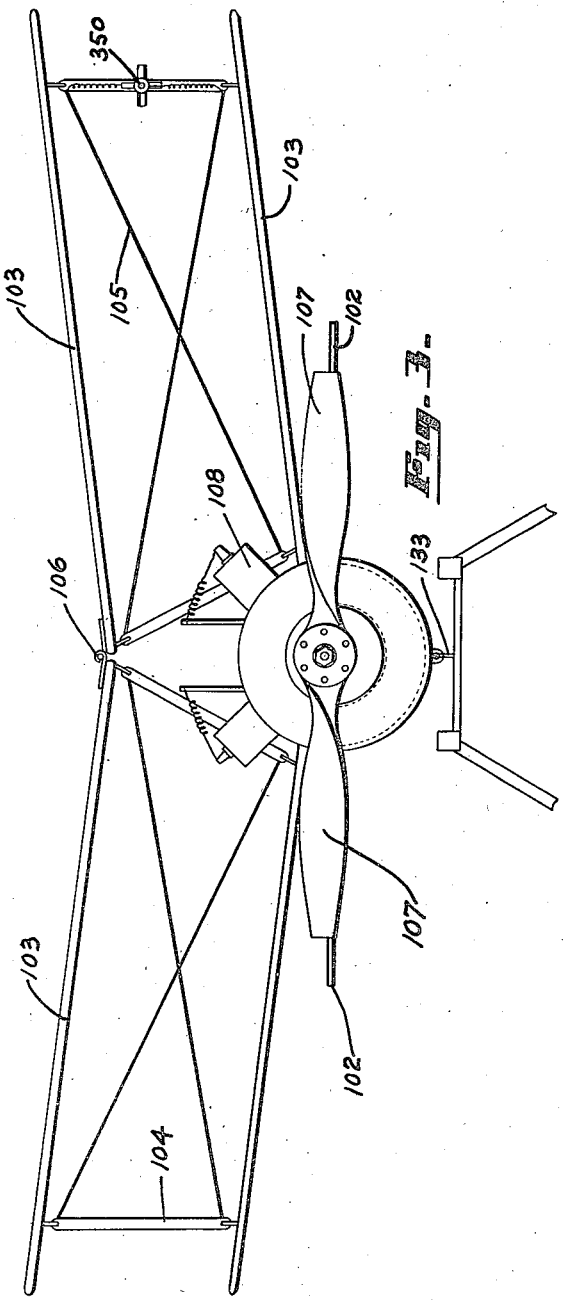

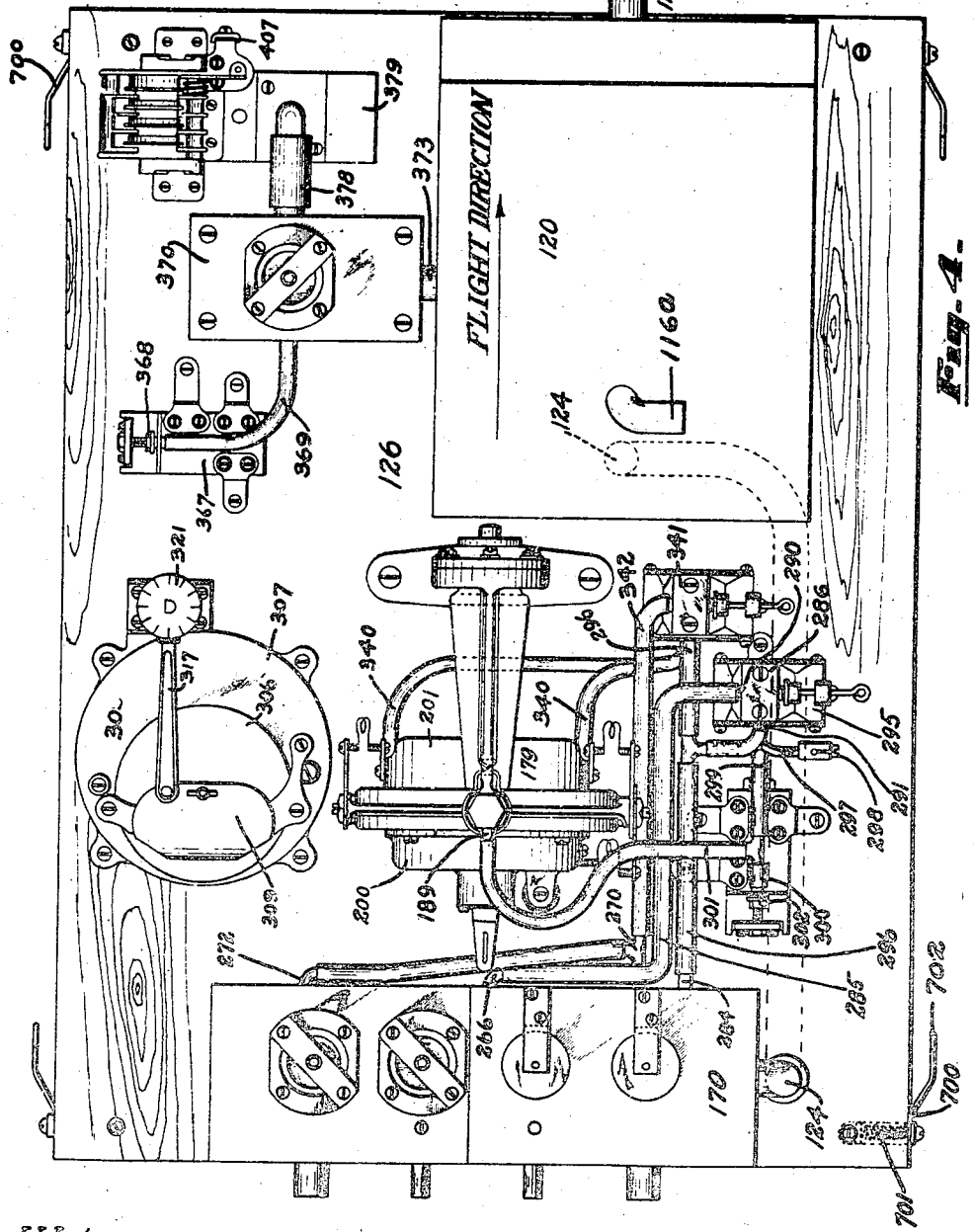

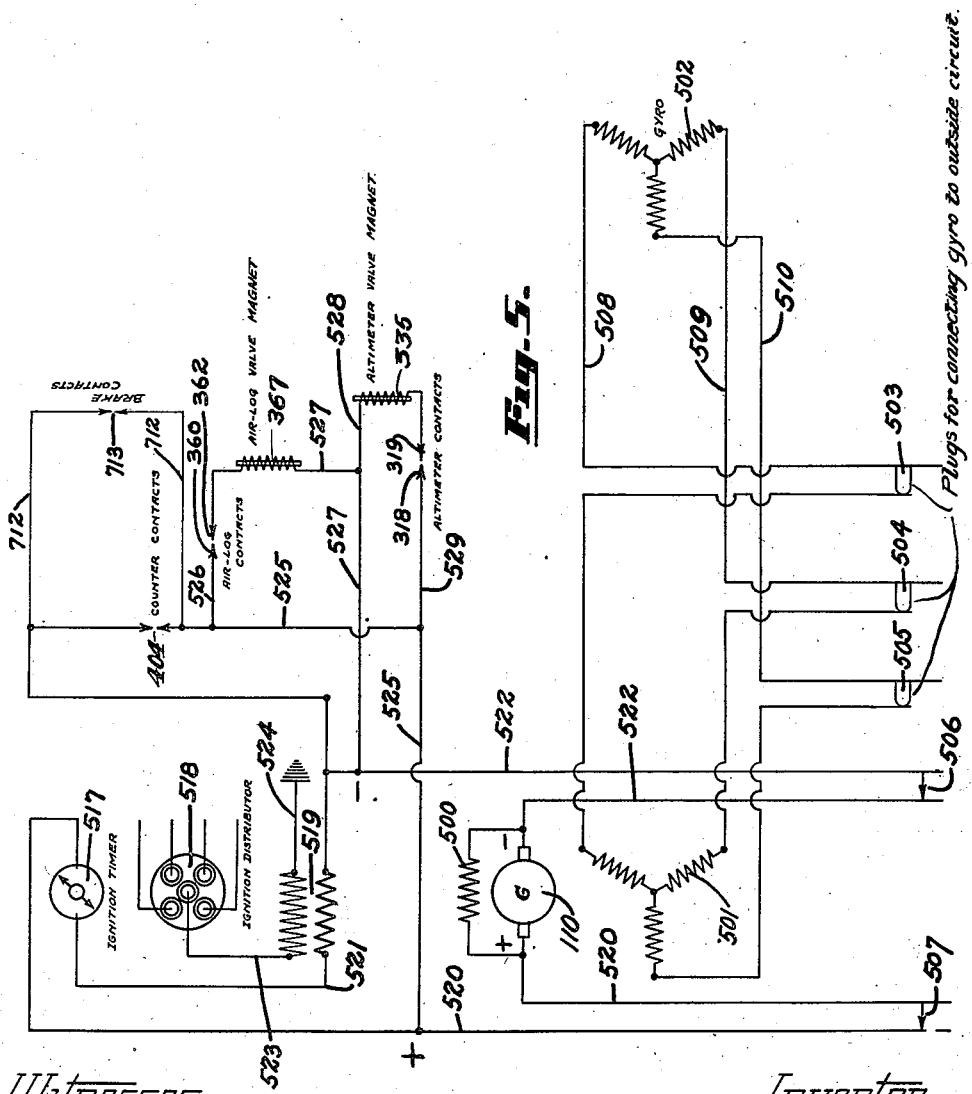

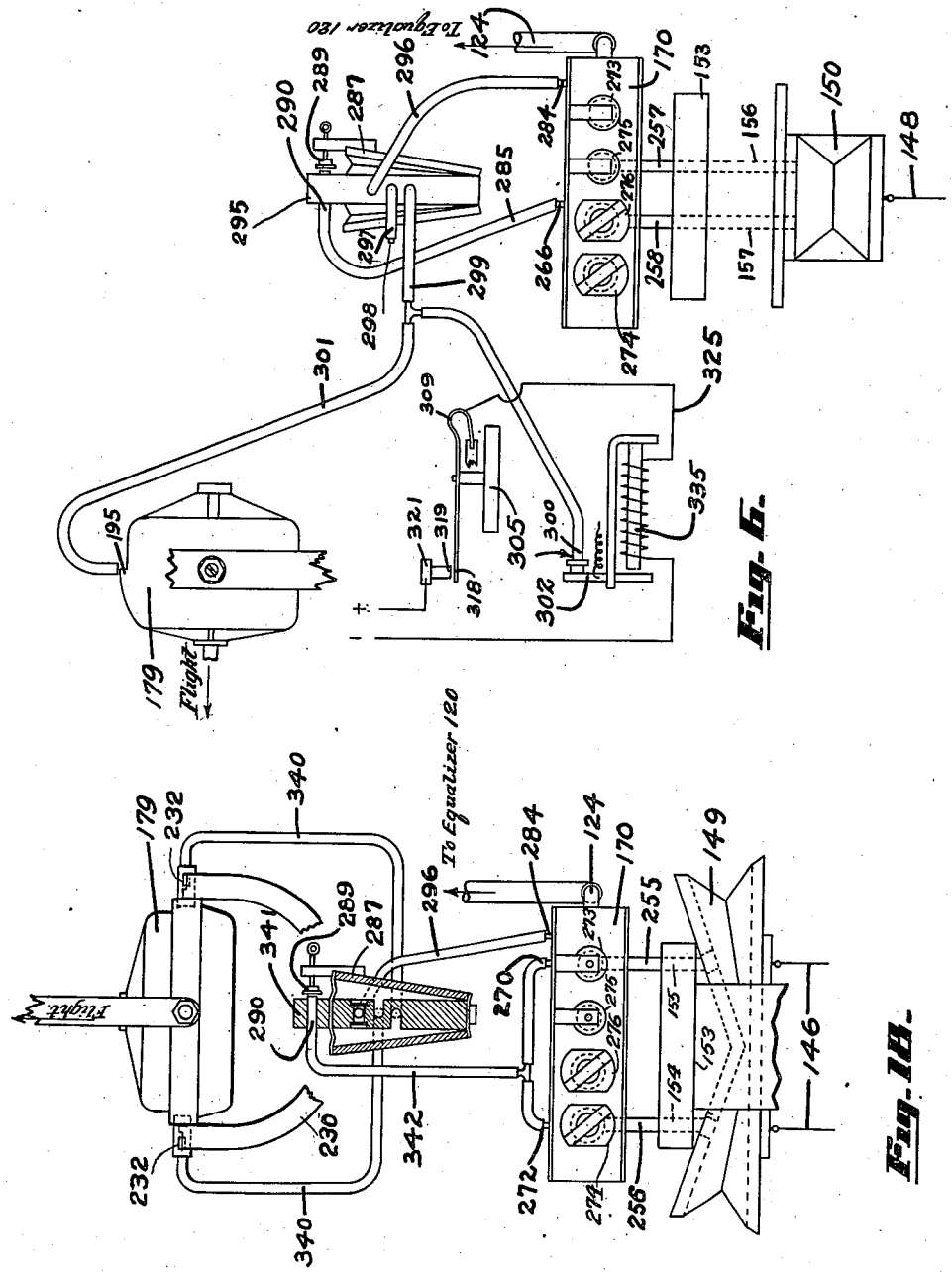

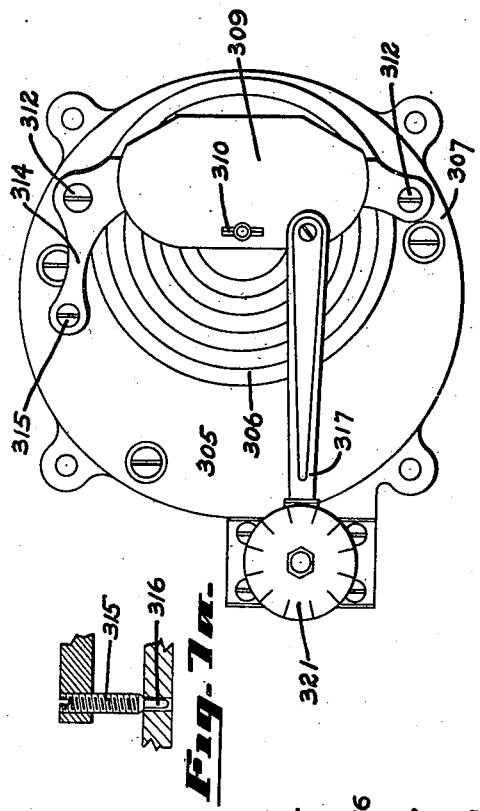
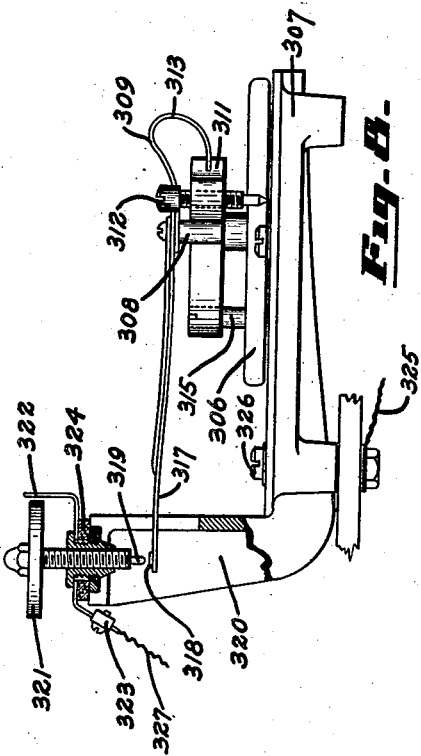
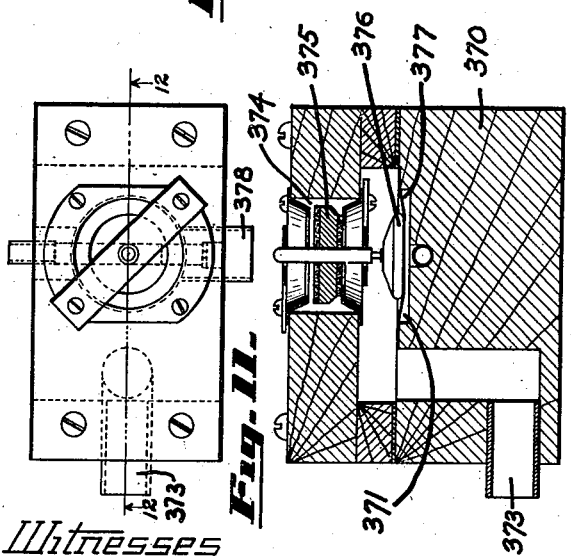
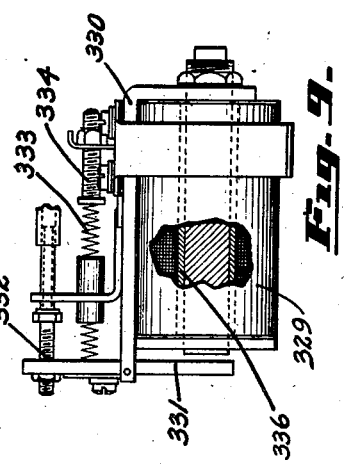

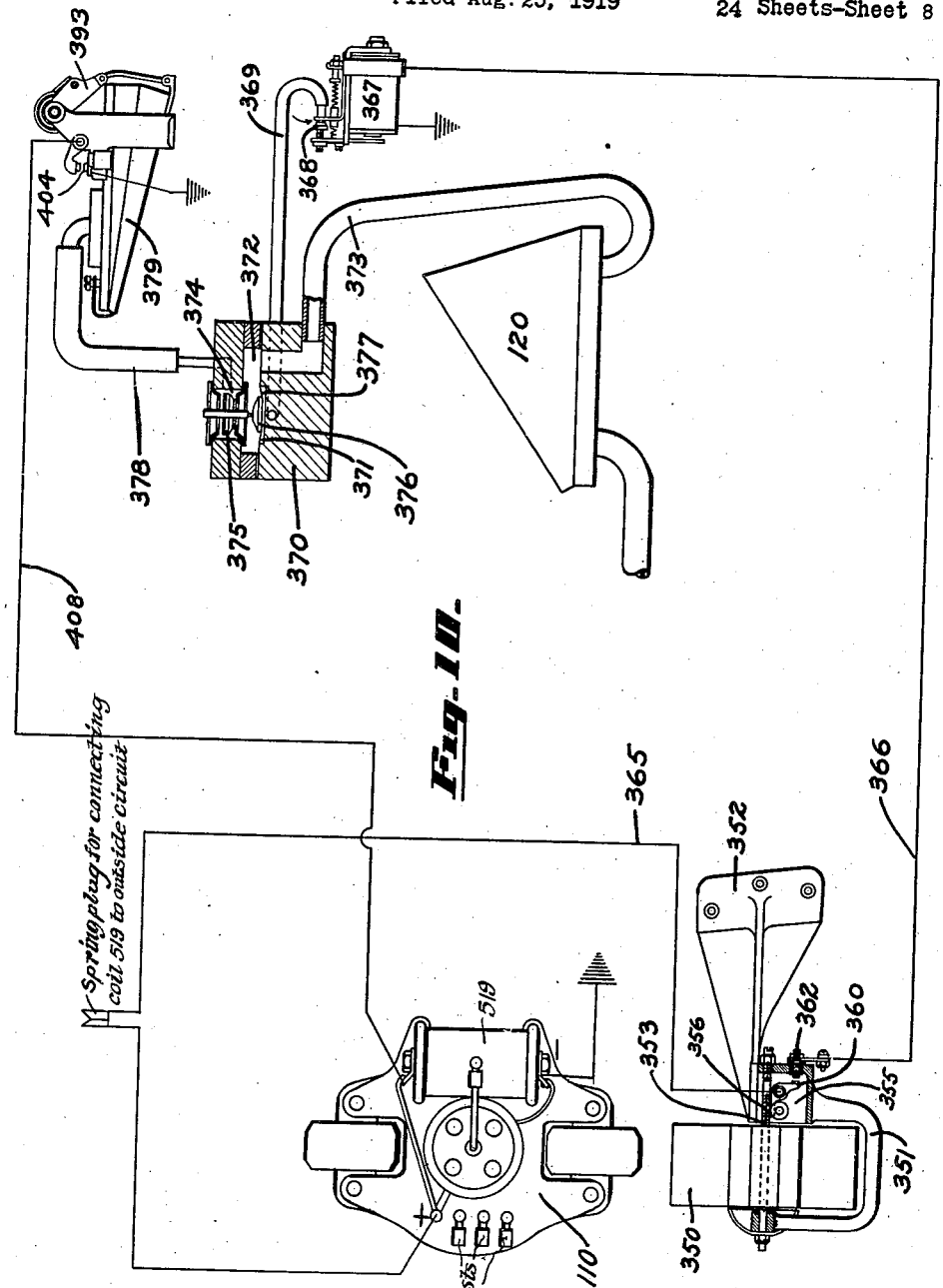

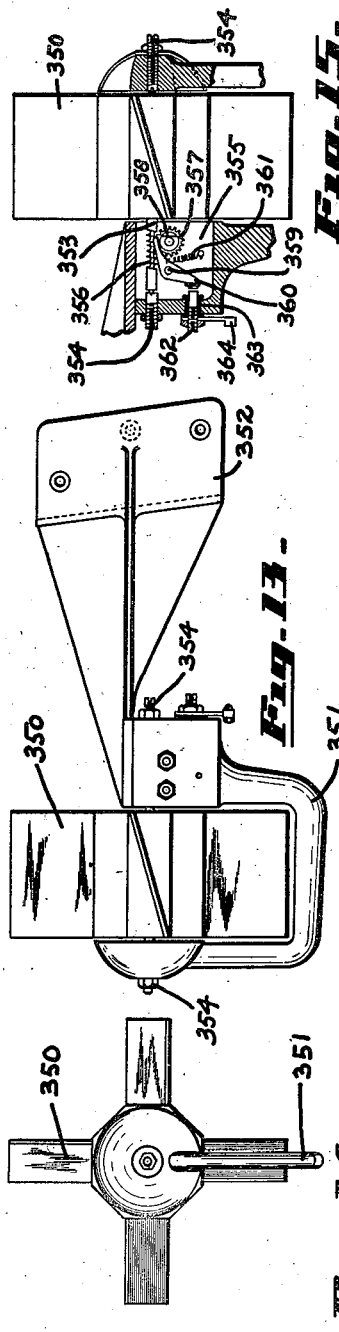
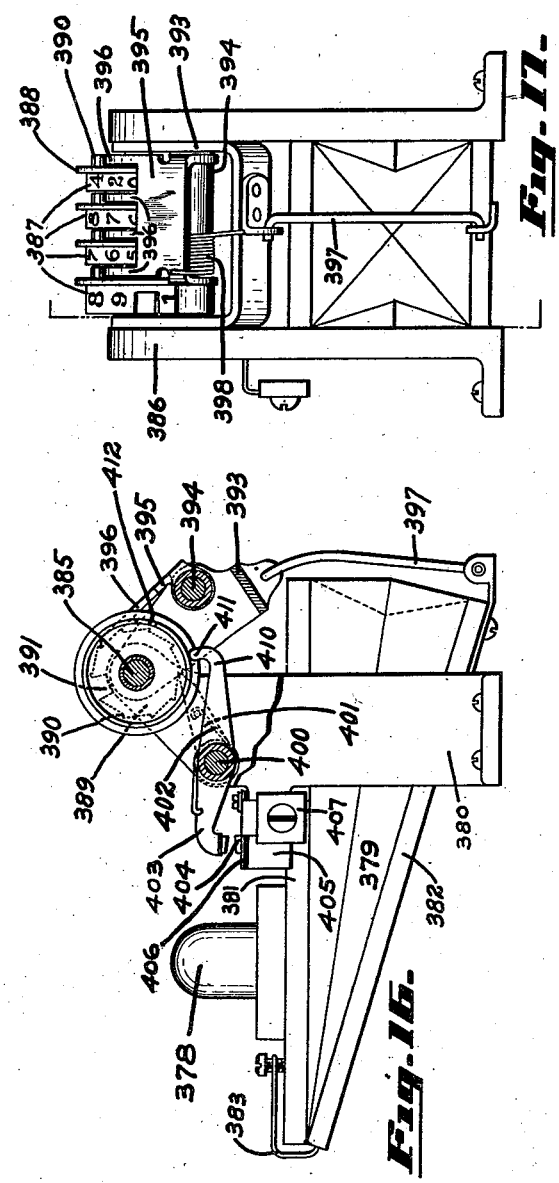

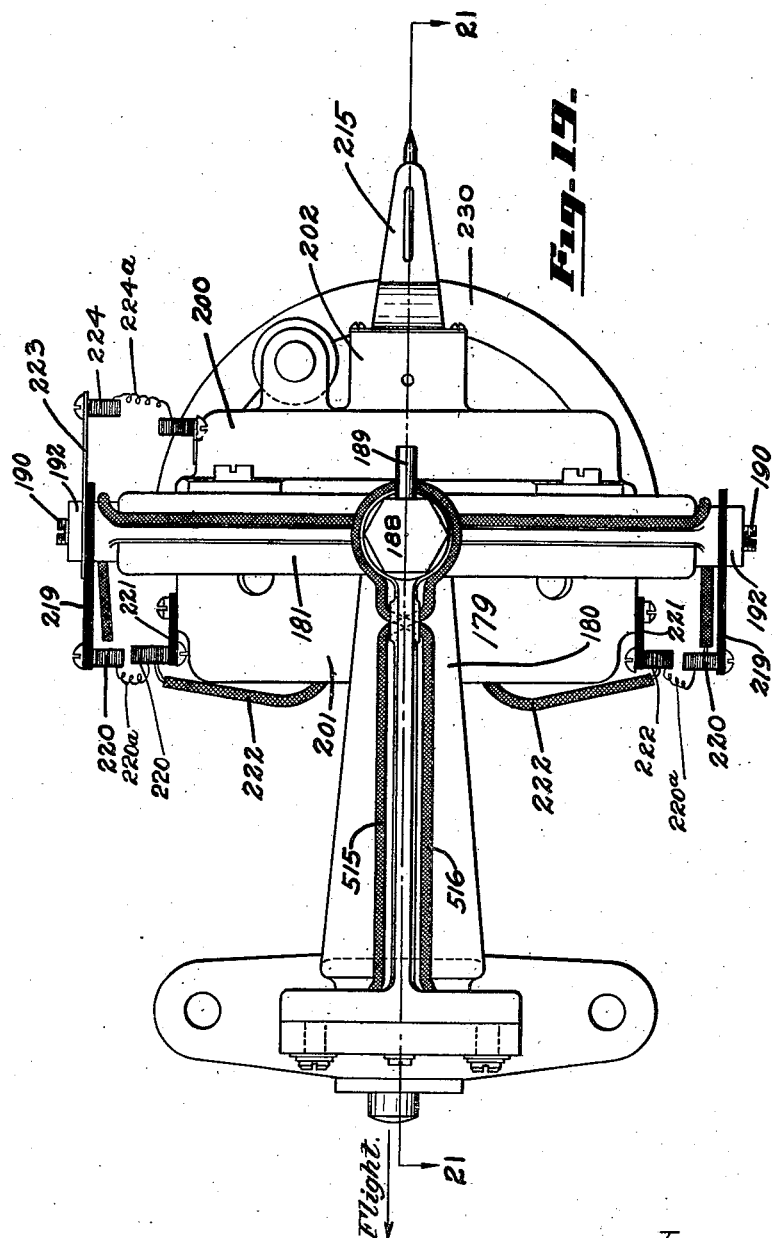

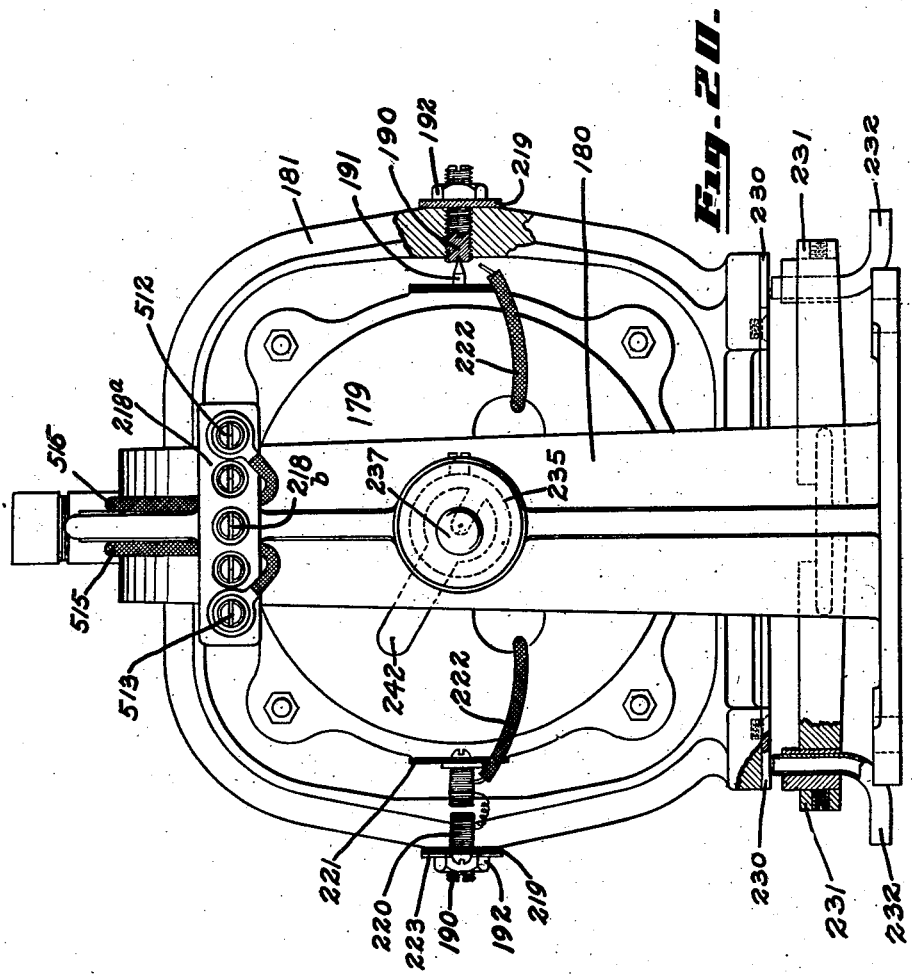

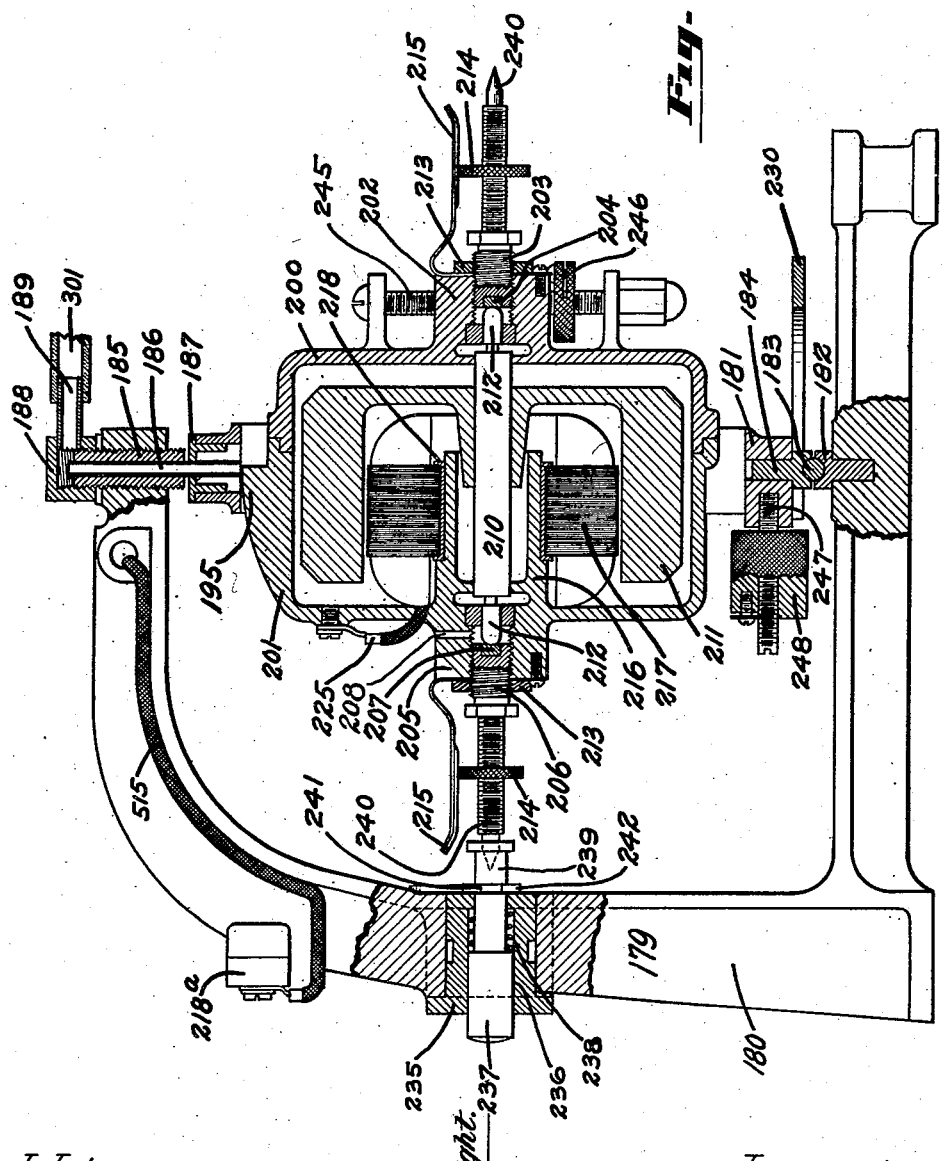

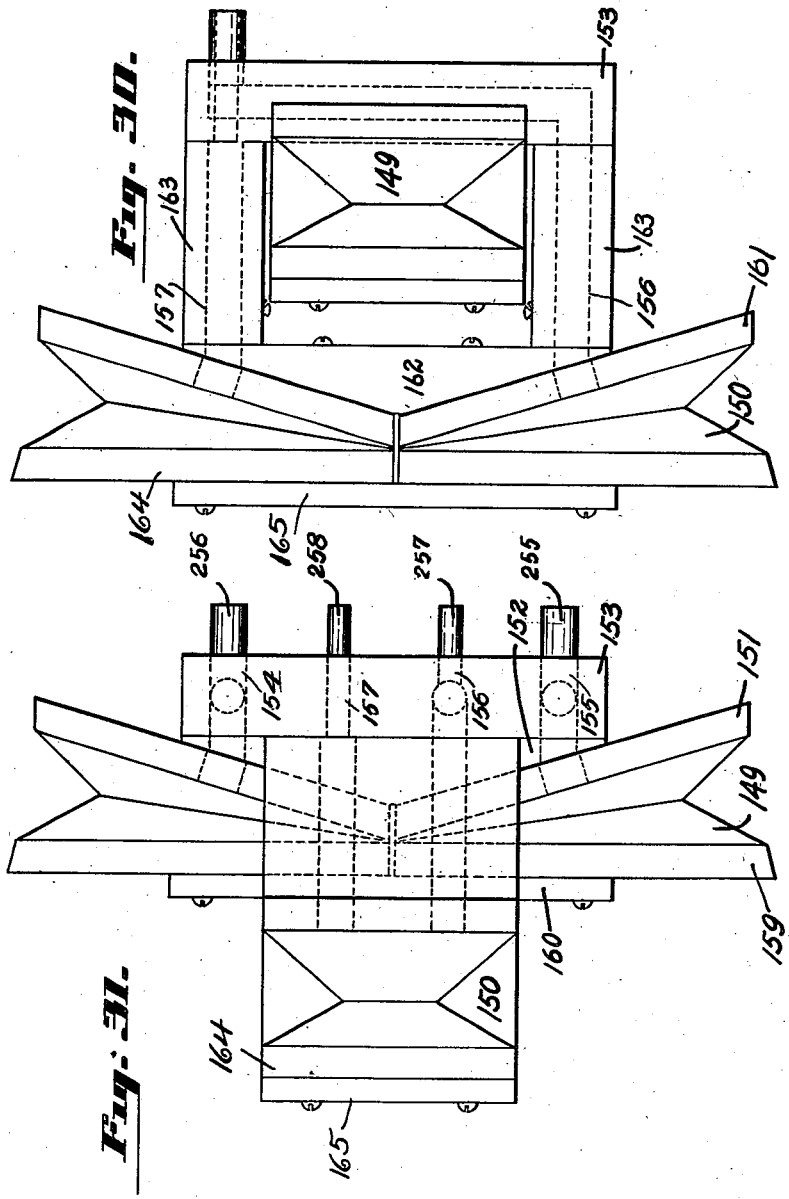

April 5, 1927.

C. F. KETTERING

CONTROL APPARATUS

Filed Aug. 25, 1919

INVENTOR
Charles F. Kettering
BY Kerr, Page, Cooper & Ed Hayward
ATTORNEY

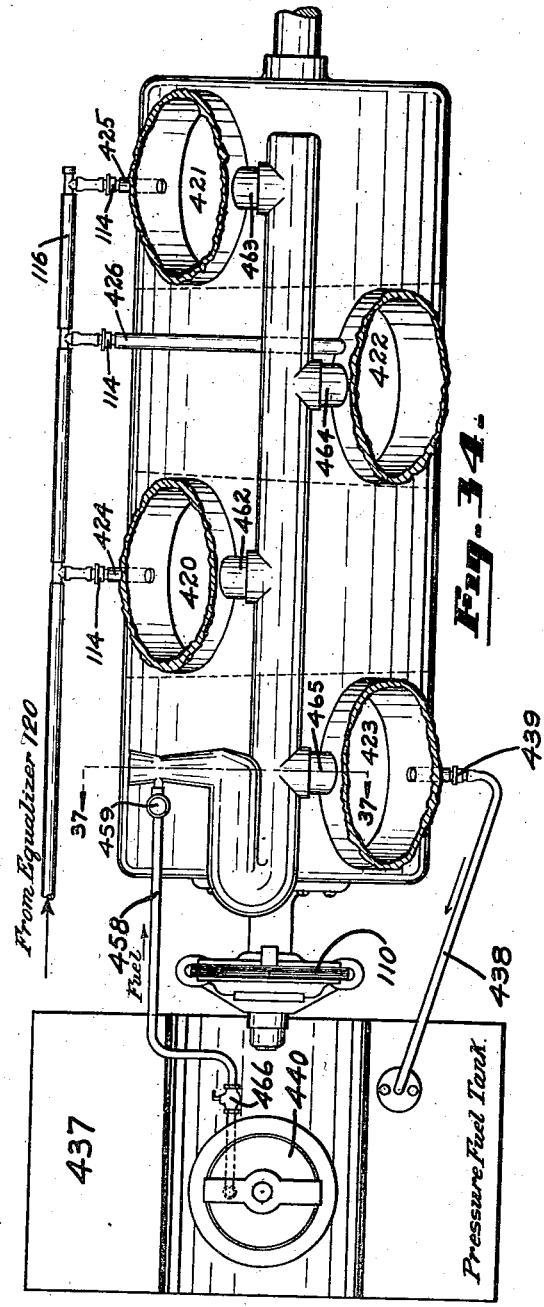

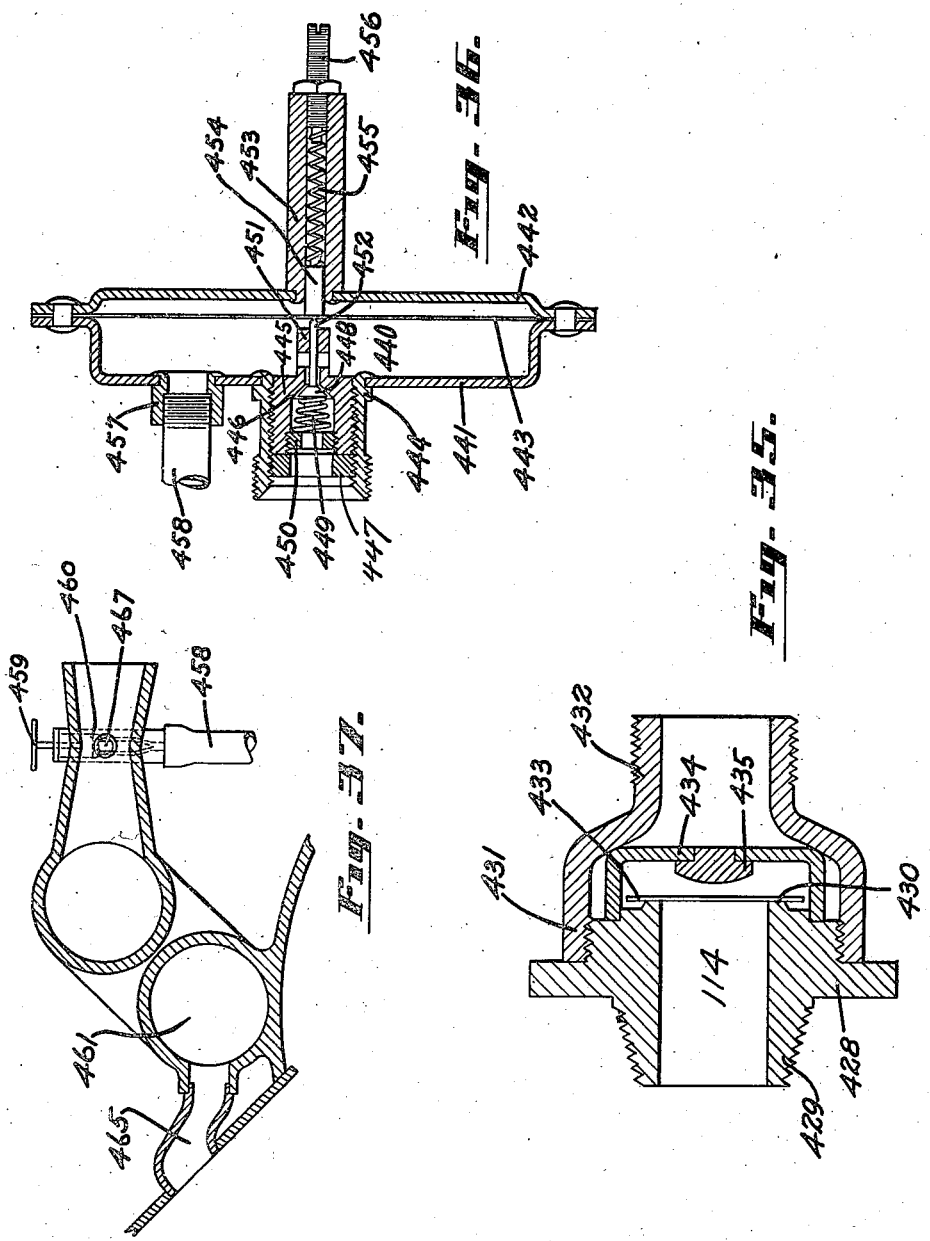

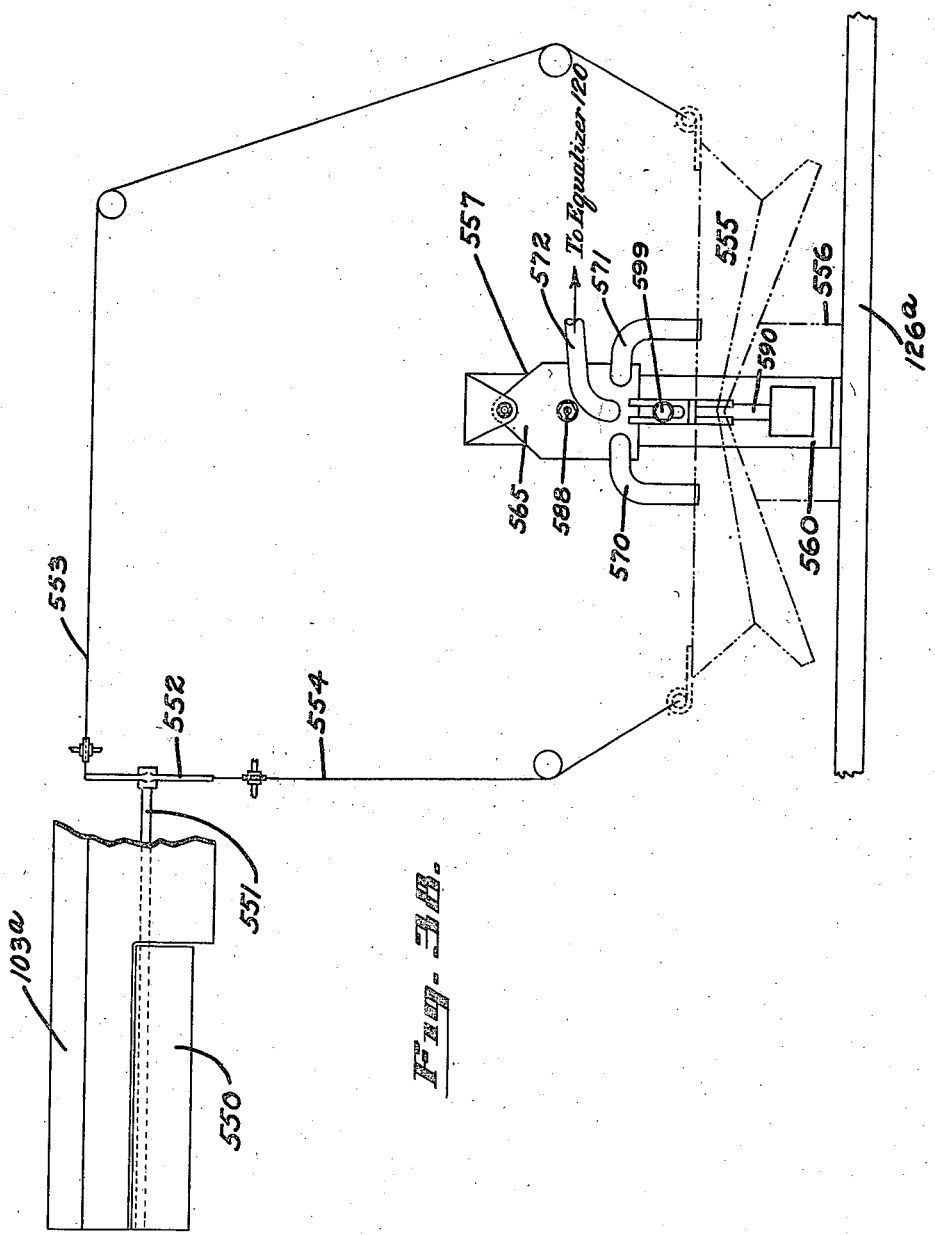

April 5, 1927.
C. F. KETTERING
1,623,121
CONTROL APPARATUS
Filed Aug. 25, 1919      24 Sheets-Sheet 19
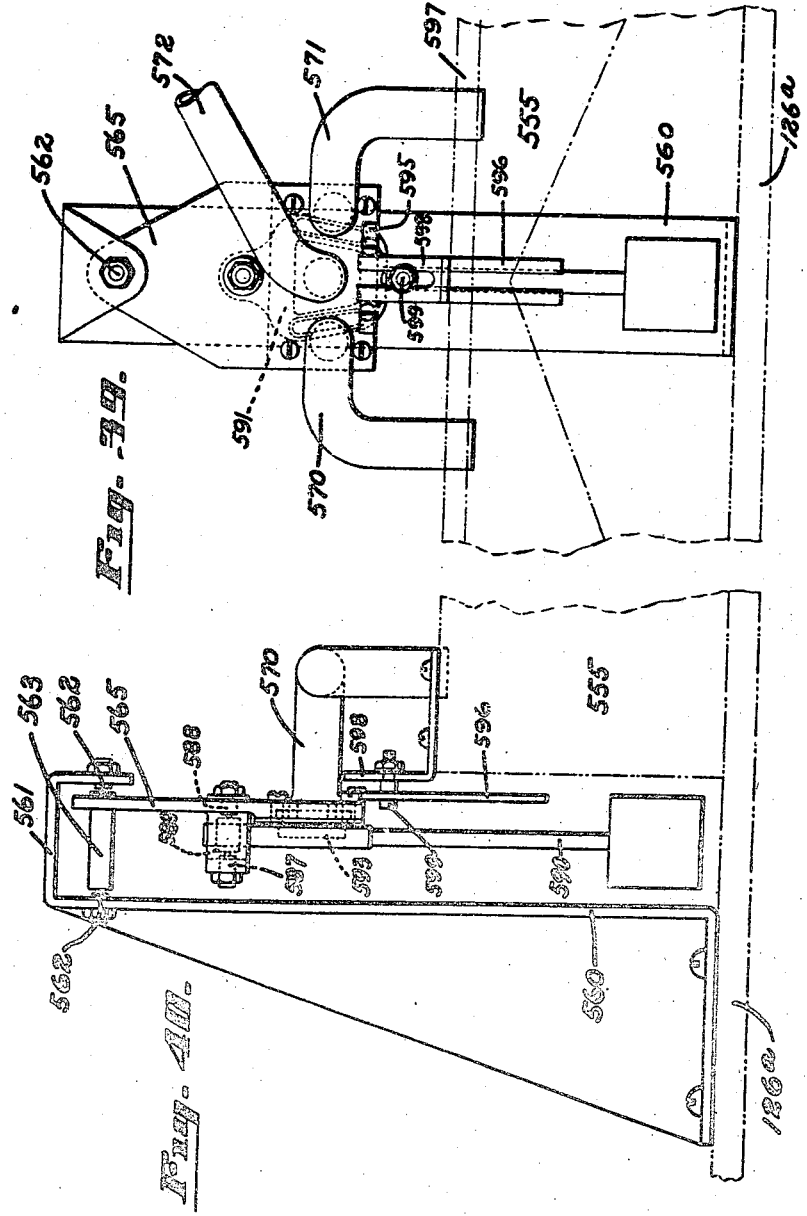

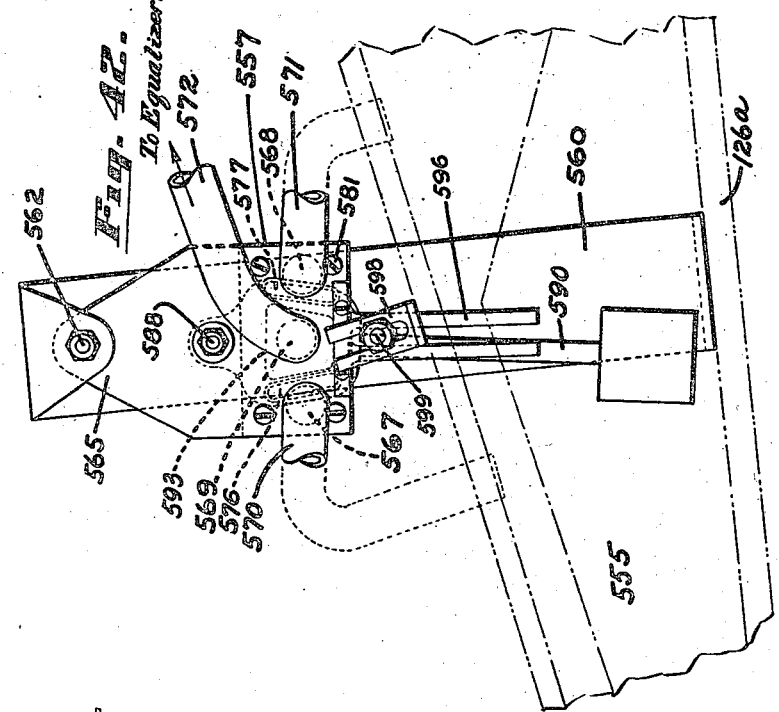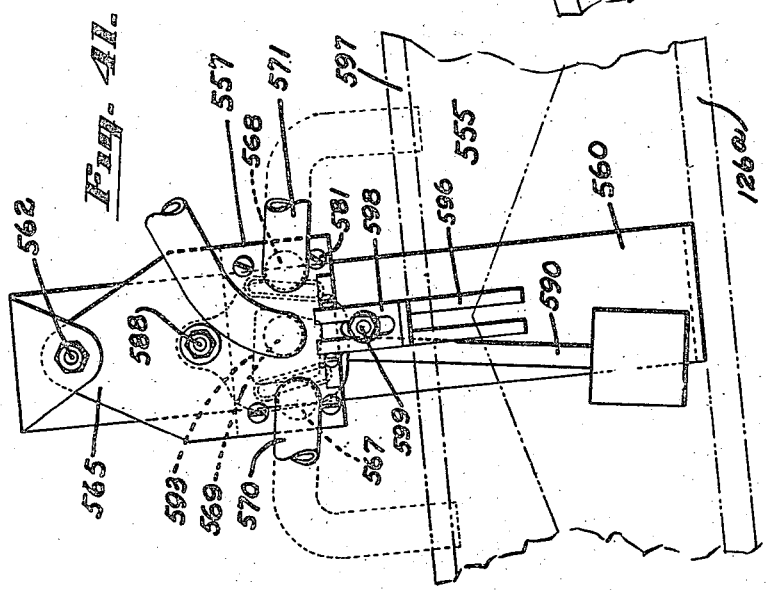

April 5, 1927.
C. F. KETTERING
1,623,121
CONTROL APPARATUS
Filed Aug. 25, 1919
24 Sheets-Sheet 21
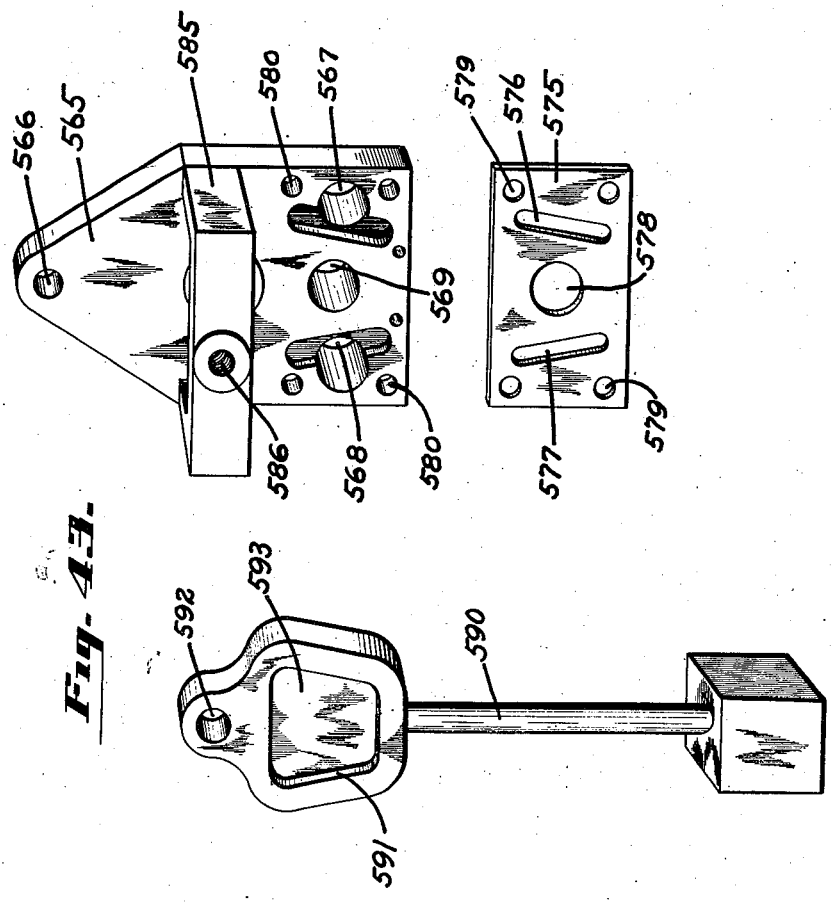

April 5, 1927.
C. F. KETTERING
CONTROL APPARATUS
Filed Aug. 25, 1919
1,623,121
24 Sheets-Sheet 22
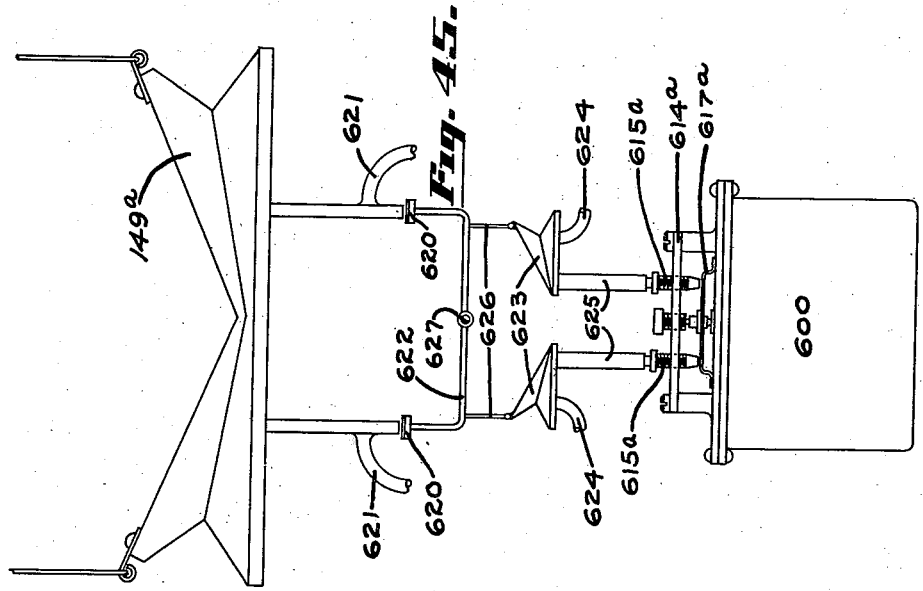
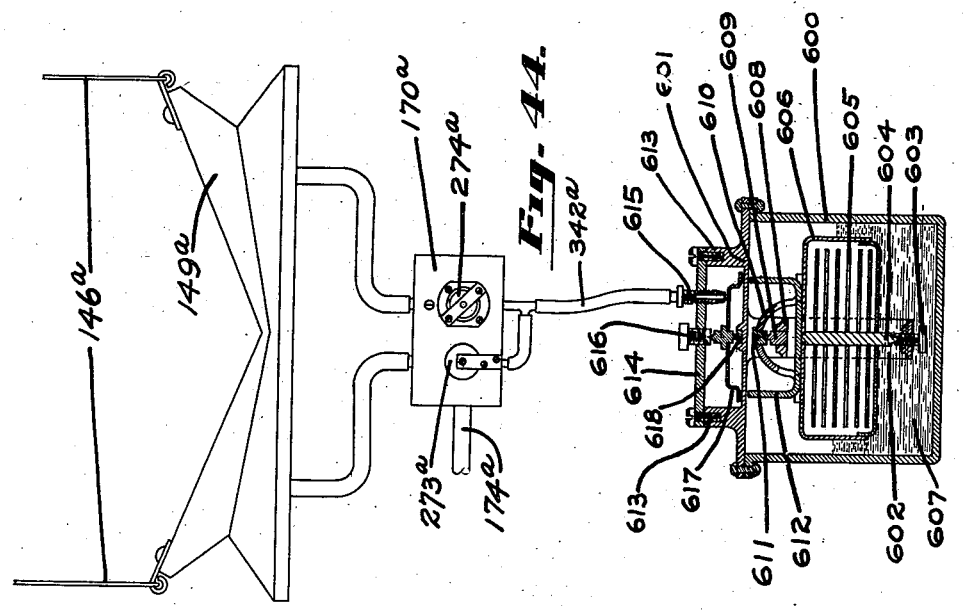

April 5, 1927.
C. F. KETTERING
CONTROL APPARATUS
Filed Aug. 25, 1919
1,623,121
24 Sheets-Sheet 23
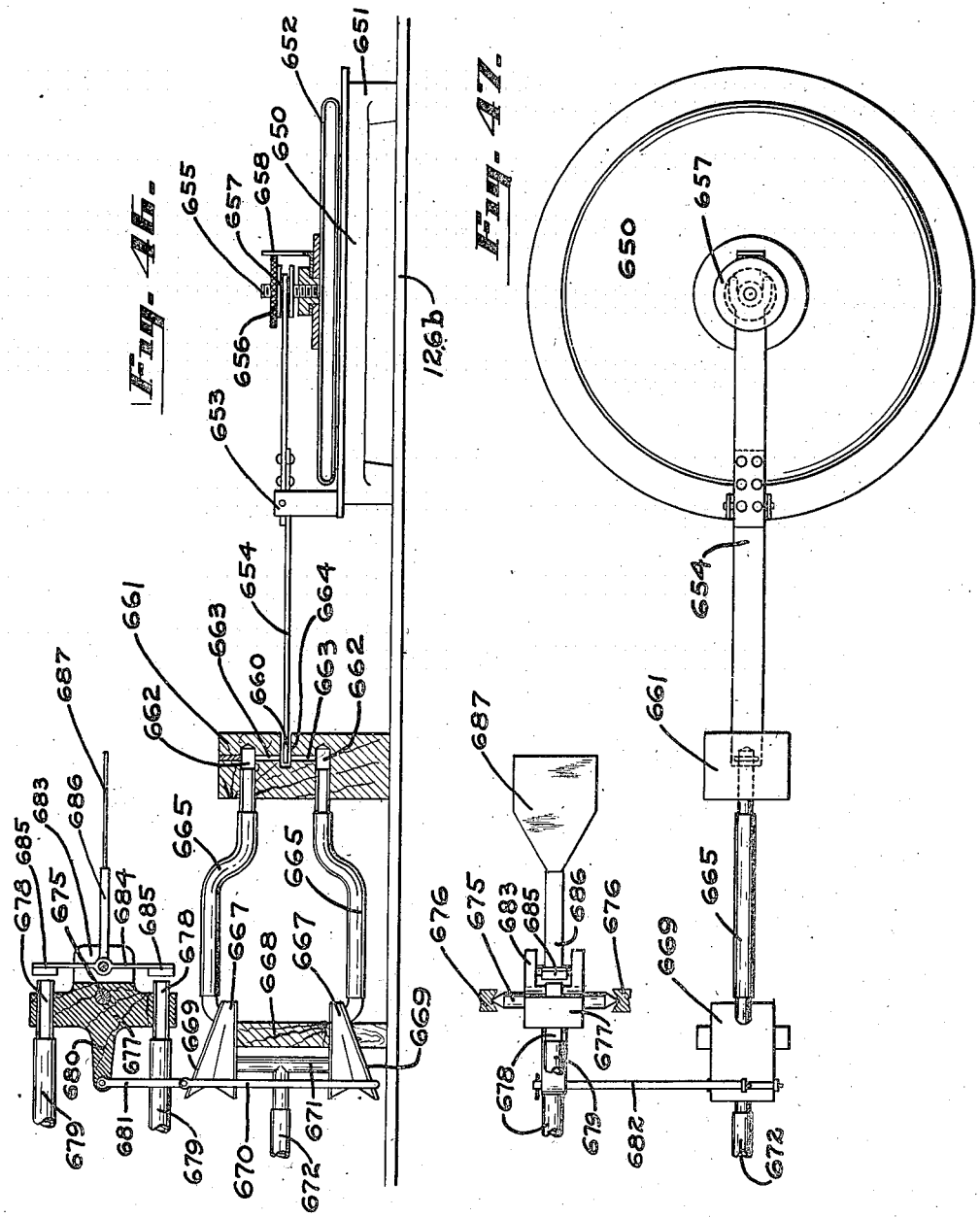

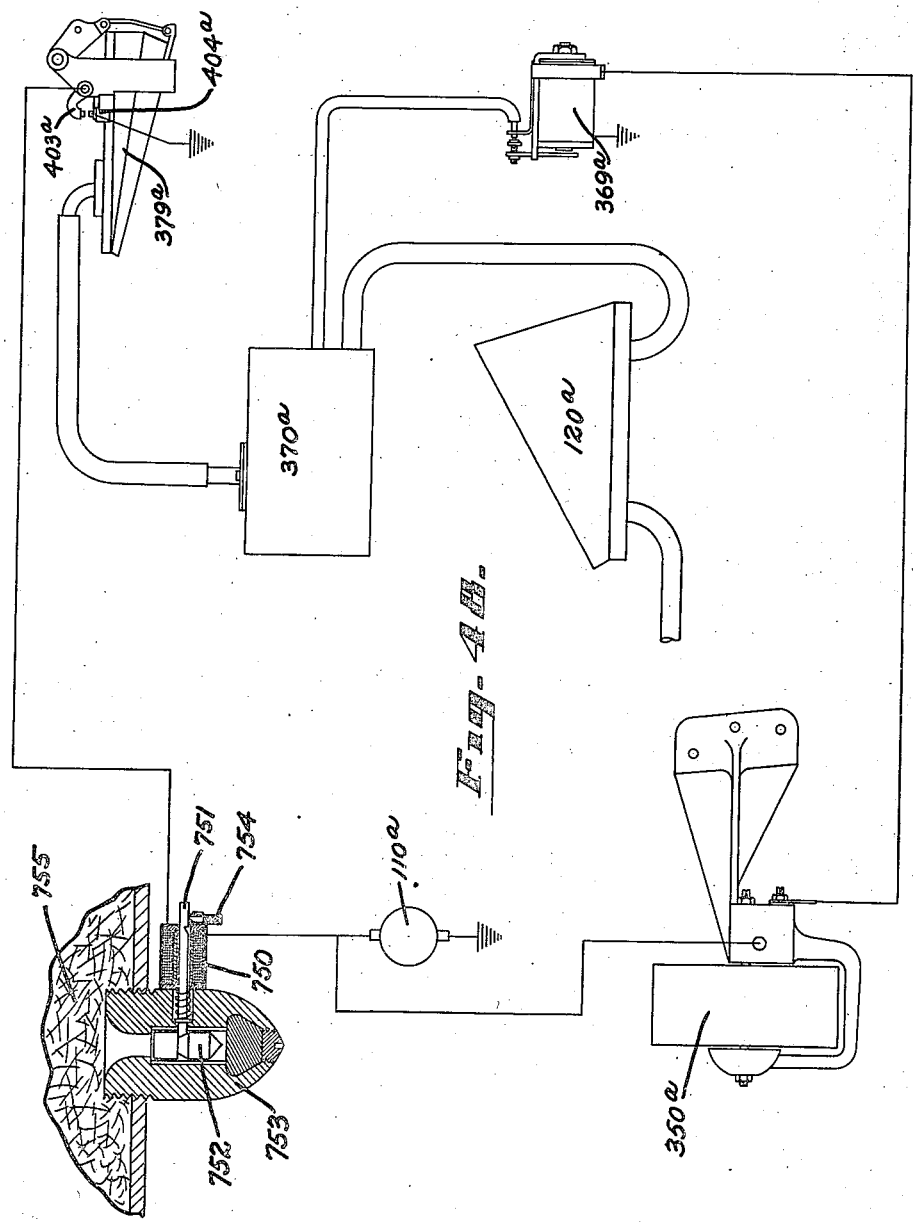

Patented Apr. 5, 1927.

1,623,121

UNITED STATES PATENT OFFICE.

CHARLES F. KETTERING, OF DAYTON, OHIO, ASSIGNOR, BY MESNE ASSIGNMENTS, TO DAYTON-WRIGHT COMPANY, OF DAYTON, OHIO, A CORPORATION OF DELAWARE.

CONTROL APPARATUS.

Application filed August 25, 1919. Serial No. 319,667.

This invention relates to apparatus for controlling the movements of a vehicle, and more particularly to apparatus for controlling a vehicle adapted for movement in, through or on a sustaining medium.

One of the primary objects of the invention is to provide apparatus for controlling the movement of a vehicle, particularly a self-propelled vehicle, such as an airplane, a torpedo, or a ship, which apparatus is adapted for controlling the direction of movement of the vehicle, the distance over which it travels and, in the case of an airplane or torpedo, the altitude, or depth, at which the vehicle moves.

Another object of the invention is to provide apparatus of this character which is automatic in its action, and which is partly dependent upon pneumatic mechanism for its satisfactory operation.

Still another object of the invention is to provide a vehicle which is self-propelled and which has such control apparatus that its path of movement and the distance traversed by it are automatically controlled.

Still another object is to provide an airplane, or aerial torpedo, having control apparatus of this character, which is adapted to maintain lateral equilibrium during flight.

Other objects and advantages of the invention will be apparent from the description set out below, when taken in connection with the accompanying drawing.

For purposes of easier description the apparatus forming the subject of this invention has been illustrated in connection with an airplane, adapted to act as an aerial torpedo. It is obvious, however, that this apparatus is not limited to the specific disclosure but that it is equally applicable to other types of vehicles, such for instance as a torpedo or ship, adapted for movement in, through or on a sustaining medium.

In the drawing in which like numerals designate like parts throughout,

Fig. 1 shows an airplane, or aerial torpedo, mounted upon a launching car, the automatic control apparatus, and associated elements being shown diagrammatically;

Fig. 2 is a plan view of the apparatus in Fig. 1 with parts of the structure of the airplane broken away to permit an unobstructed view of the control mechanism;

Fig. 3 is a front elevational view of the airplane shown in Figs. 1 and 2;

Fig. 4 is an assembly view, in plan, of the instrument board;

Fig. 5 is a wiring diagram of the various electrical circuits used in the control apparatus;

Fig. 6 is a diagrammatic layout of the altitude control;

Fig. 7 is a plan view, in detail, of the altimeter proper;

Figure 32:
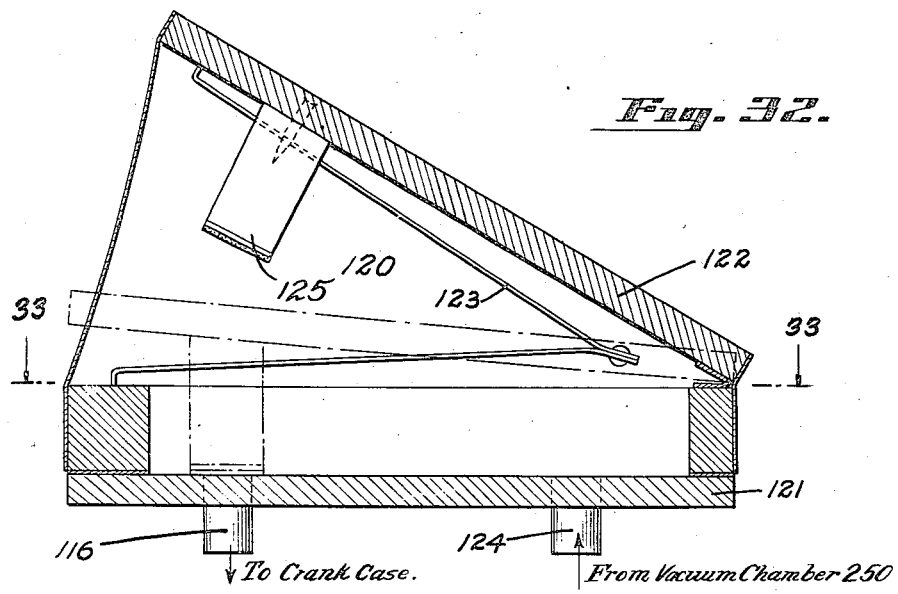
Figure 33:
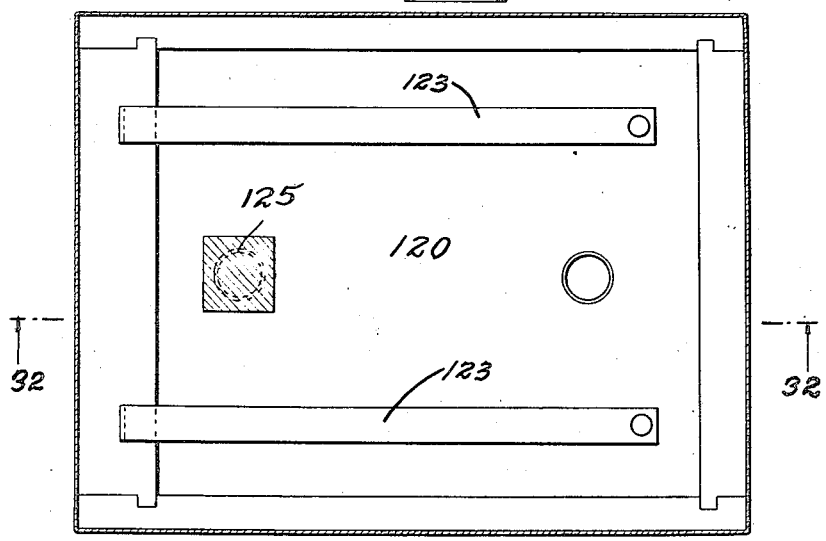

Fig. 7ª is a detail view of one of the adjusting screws in the altimeter shown in Fig. 7;

Fig. 8 is a side view, partly in section of the altimeter shown in Fig. 7;

Fig. 9 is an elevational view parts being broken away of the electrically operated valve forming an element of the control apparatus, and comprising a damping element;

Fig. 10 shows the distance control mechanism;

Fig. 11 is a plan view of the pneumatic valve box forming a part of the distance control;

Fig. 12 is a sectional view of the valve box shown in Fig. 11, along the line 12—12;

Fig. 13 is a side elevation of the air log shown in Fig. 10;

Fig. 14 is a front view of the apparatus shown in Fig. 13;

Fig. 15 is a view partly in section of the air log and circuit closing apparatus operated thereby;

Fig. 16 is a view in elevation, with parts thereof broken away, of the counter forming an integral part of the distance control;

Fig. 17 is an end view in elevation of the apparatus in Fig. 16;

Fig. 18 is a diagrammatic view of the direction control;

Fig. 19 is a plan view, in detail, of the gyroscope forming an element of the altitude and direction controls;

Fig. 20 is a view in front elevation of the gyroscope, with certain parts thereof shown in section to more clearly disclose certain details of construction;

Fig. 21 is a side view of the gyroscope with parts thereof shown in section, such section being taken along the line 21—21 of Fig. 19;

Fig. 22 is a plan view of the main pneumatic valve box;

Fig. 23 is a sectional view through the apparatus shown in Fig. 22, along the line 23—23;

Fig. 24 is a sectional view along the line 24—24 of Figs. 22 and 23;

Fig. 25 is a sectional view along the line 25—25 of Figs. 22 and 23;

Fig. 26 is a side elevation of one of the balanced pneumatics forming a part of the control system;

Fig. 27 is an elevational view of the balanced pneumatic shown in Fig. 26, such view being 90° from the view of Fig. 26;

Fig. 28 is a sectional view through the balanced pneumatic, along the line 28—28 of Figs. 27 and 29;

Fig. 29 is a plan view of the balanced pneumatic shown in Figs. 26 and 27;

Fig. 30 is a side elevation of the main operating bellows unit etc.;

Fig. 31 is a plan view of the same apparatus shown in Fig. 30;

Fig. 32 is a sectional view through the vacuum equalizer taken along the line 32—32 of Fig. 33;

Fig. 33 is a sectional view through the vacuum equalizer taken along the line 33—33 of Fig. 32;

Fig. 34 is a somewhat diagrammatic view of the engine with parts thereof broken away, showing the fuel feeding system and the connections to the engine crank case;

Fig. 35 is a sectional view through one of the check valves shown in Fig. 34;

Fig. 36 is a sectional view through the pressure regulating valve of the fuel supply system;

Fig. 37 is a sectional view through the fuel system, along the line 37—37 of Fig. 34;

Fig. 38 is a diagrammatic view of an aileron control;

Fig. 39 is a front elevational view of pendulum mechanism constituting an element of this control;

Fig. 40 is a side view, in elevation, of the pendulum mechanism;

Fig. 41 is a view of the pendulum control in an intermediate operative position;

Fig. 42 is a view of the pendulum control in the completed operative position, of which an intermediate stage is shown in Fig. 41;

Fig. 43 is a detail view of several elements of the pendulum mechanism;

Fig. 44 shows a modified form of directional control comprising a compass;

Fig. 45 shows still another form of compass directional control;

Fig. 46 shows a somewhat diagrammatic view of modified apparatus for controlling the altitude and angle of climb;

Fig. 47 shows another view of the control illustrated in Fig. 46; and

Fig. 48 shows a supplementary distance control adapted to render the detonator for the explosive charge active after a predetermined distance has been traveled.

As stated above, in illustrating a preferred embodiment of the invention it is shown in connection with an airplane. In the particular embodiment illustrated the airplane constitutes in effect an aerial torpedo, that is a self-propelled airplane carrying a large charge of explosive and having control mechanism adapted to so direct its movement that it may be caused to travel over a desired path and land upon a predetermined objective. In the aerial torpedo illustrated controlling apparatus is provided which is adapted for controlling its direction of flight, its angle of climb or descent, the altitude at which it moves during the greater part of its travel, the distance over which it travels, the time of setting of the detonator for the explosive, and for maintaining the airplane in lateral equilibrium.

In the embodiment of the control mechanism illustrated a combination of pneumatic and electrical means is used. In the preferred embodiment illustrated and particularly described herein, the pneumatic system which is used is a vacuum-pneumatic system, the operating vacuum being less than sixty inches of water. It is to be understood, however, that the invention is not limited to a pneumatic system operating upon such vacuum, inasmuch as it might operate just as satisfactorily with vacuums in excess of sixty inches of water or with pneumatic systems in which a pressure in excess of atmospheric is used.

The airplane illustrated, and in connection with which the pneumatic system is particularly described, is built along substantially conventional lines, and comprises a body portion, or fuselage, 100 having a rudder 101, elevators 102 and wings 103, of the biplane type. As clearly shown in Fig. 3 of the drawing, the wings are arranged in the form of a comparatively large dihedral angle, which lends itself to inherent lateral stability, that is to the maintaining of lateral equilibrium. These wings are braced and supported by means of struts 104 and bracing wires 105, the two upper wings being held together by means of a hinge-like construction 106.

Propulsion of the airplane is secured by means of a propeller 107 driven by the engine 108. So far as propelling the plane is concerned this engine may be of any desired type, but in order to render more simple the control apparatus it is preferably of the two-cycle type. As shown the engine 108 consists of a two-cycle, four-cylinder air-cooled, internal-combustion engine of the "V-type", the cylinders being set at an angle of 90°. A detailed description of the engine is not given herein inasmuch as any conventional and efficient type of two-cycle engine would operate satisfactorily in this connection. One of the reasons for using a two-cycle engine is to utilize the engine itself to furnish the operating vacuum. A two-cycle engine has its crank case gas tight and divided into separate compartments of substantially equal volume, one compartment for each cylinder. On the up stroke of any piston in such an engine there is a tendency to create a vacuum within the associated compartment, which results in the drawing in of the explosive mixture. This tendency to form a vacuum within the compartments of the crank case may be utilized for securing the vacuum necessary for operating the control apparatus. If desired, any type of engine other than a two-cycle engine might be used, and where such other type of engine is used means, such as a pump, could be provided for securing the operating vacuum.

In the type of apparatus shown three of the four cylinders of the engine are used for generating the operating vacuum, as shown in Fig. 34, the three cylinders used being those associated with the crank case compartments 420, 421 and 422. Opening into each of these three compartments respectively are the pipes 424, 425 and 426, each of these pipes having therein a check valve 114. Each of these check valves is adapted to permit the ready passage of air into the crank case compartment associated therewith during up stroke of the piston, but to prevent back flow from such compartment during down stroke of the piston. Each of the pipes 424, 425 and 426 leads into a main pipe 116, which in turn leads into the vacuum equalizer 120, carried by the instrument board 126.

As shown most clearly in Figs. 32 and 33, this equalizer comprises a fixed member 121 to which is hingedly connected the movable member 122, a plurality of springs 123 being interposed between the two members and adapted to urge them towards extended position. Leading off from the equalizer is a pipe 124 which is connected, through the main valve box 170, to the main operating mechanism for several of the controls, more particularly those for the rudder and elevator. During operation of the engine there is a tendency to suck air out of the equalizer 120, through the pipe 116, to thus form a vacuum therein, and, because of the pipe 124, there is at the same time a tendency to form a vacuum throughout the pneumatic controlling system connected to the pipe 124. The equalizer 120 is made of substantial size, to act as a reservoir of vacuum, so to speak. That is to say, the equalizer 120 being made of substantial size is adapted to maintain a uniform suction, or vacuum, throughout the system connected with the pipe 124 despite fluctuations in the vacuum creating tendency of the engine, the size of the equalizer being sufficient to take care of any fluctuations normally encountered in the operation of the engine. As shown, the equalizer is adapted for operation upon sub-atmospheric pressures, that is to say, partial vacuum, the springs 123 being adapted to urge it in wide-open position against the compressing forces resulting from the unbalanced pressures upon the outside and the inside thereof. Carried upon the movable member 122 of the equalizer is a valve 125 adapted, should the vacuum in the equalizer become sufficient to cause complete collapsing thereof, to close the open end of the pipe 116. The equalizer, and control systems associated therewith, would thus be cut off from the source of suction and excessive vacuum thus avoided. Where operating upon pressures in excess of atmospheric, that is, upon compressed air, the springs 123 should be so rearranged that they would tend to compress the equalizer bellows, and the valve 125 should also be rearranged so that it would close the open end of pipe 116 when the equalizer was completely expanded and thus prevent excessive pressures upon the control systems associated therewith.

As stated above the airplane illustrated herein is adapted primarily as an aerial torpedo or carrier of explosive. Naturally in any such device the desire is to eliminate as many of the parts of the conventional airplane as may be. Consequently I have illustrated a preferred embodiment of such an aerial torpedo in which the airplane carries no form of launching or landing gear. For launching such an airplane a launching car 130 having wheels 131 adapted to run upon a track 132 is provided. This launching car may be of any desired construction, that shown being a light type of car that functions quite satisfactorily. In launching an airplane from such a car the plane is held in place thereon by means of a wire 133, the tensile strength of which is just sufficient to hold the airplane in position upon the launching mechanism until it has attained a velocity at which it is fully capable of sustaining itself in the air. That is to say, in launching, the car carrying the airplane is placed upon the track 132, which is preferably arranged on a decline. The airplane, on the launching car, is then run down the track, under its own power, until it attains a speed at which it is capable of sustained flight. At this speed it should have a lift substantially greater than the weight of the plane. To insure the attainment of this desirable launching speed, the wire 133 is made of such strength that the lifting force necessary for both lifting the airplane from the car and for breaking the wire, will not be present until such desirable speed has been reached. In order to prevent the airplane from lifting the car from the track, small-wheels 134, attached to the frame of the car and adapted to cooperate with the under side of the track, are provided.

A launching car such as described is adapted, of course, for repeated use. Unforeseen conditions sometimes arise which prevent the airplane from attaining sufficient speed to permit of proper launching, in which case the car would run to the end of the track where damage to both the plane and car might result. And in the case of an aerial torpedo carrying several hundred pounds of explosive, this damage might be quite considerable. In order to prevent such happenings, and to eliminate the danger of damage to the launching car and to the airplane, mechanism is provided whereby the car is automatically brought to a stop after a certain predetermined distance along the track has been covered, whether the airplane has left the car or not. This mechanism is illustrated most clearly in Fig. 1, and comprises the brake shoe 135, carried by the eccentric 136 mounted upon a rotatable shaft 137. Rigidly attached to the shaft 137 is an arm 138 to which, in turn, is attached one end of the spring 139, the opposite end of the spring being attached to any convenient part of the car. The arm 138 carries an extension 140, having a notch 141 therein adapted for cooperating with the catch member 142 mounted upon the car frame. Also carried by the extension is a trigger member 143. In setting the brake mechanism the shaft 137 is rotated until the catch member 142 is received in the notch 141, such rotation lifting the brake shoe 135 out of contact with the track and placing the spring 139 under tension. Placed upon the track in any desired position is a trip member 144 which may be of any convenient construction. This trip member as shown consists of an upstanding member of such height, and so positioned, that it is adapted to contact with the trigger member 143 as the car moves over that part of the track where the trip member is placed. Upon contact of the trigger member with the trip, actuation of the trigger will result to release the arm 138 whereupon the spring will immediately cause rotation of the shaft 137 to force the brake shoe into braking contact with the track. The trip member is placed upon the track at such a distance from the starting point as to normally permit the airplane to attain the desired launching speed. And this distance of course may be varied to fit varying types of apparatus. As shown a single braking mechanism is used on the car, but obviously a similar type of mechanism may be used on the opposite side thereof. If desired both eccentrics 136 may be mounted upon a single shaft and a single spring, trigger etc. be used therewith.

In an automatically operated vehicle of the type described, such as an aerial torpedo, the control mechanism is normally adapted to maintain the vehicle during flight at substantially a uniform elevation or altitude. In launching an airplane therefore, whether it be an airplane of the conventional type having ordinary launching gear or an airplane of the type described which is launched from a car as shown in Fig. 1, it is desirable that the airplane be caused to ascend or climb at a safe angle to some predetermined altitude, after which it is desirable that subsequent travel be along substantially this predetermined altitude until the desired distance has been covered, whereupon the plane may be landed. There is considerable danger in the launching of an automatically controlled airplane of its climbing at either too great an angle or too small an angle. Where it travels at too great an angle the plane is apt to be thrown into a stall with probably disastrous results. And equally disastrous results might follow where the angle of climb is too small. To prevent either of these conditions, and to insure a desirable angle of climb, mechanism is provided for controlling the elevators.

As shown clearly in Figs. 1 and 2 the rudder of the airplane is attached to a shaft upon which is carried a rocker arm 145 to which is attached control cables 146. Attached to the shaft upon which the elevators are carried is a rocker arm 147 to which are attached control cables 148. The control cables 146 are attached to double bellows 149 while the cables 148 are operatively connected to double bellows 150. As shown in the drawing, and as would obviously be the case, the rocker arm associated with the rudder is at right angles to the rocker arm associated with the elevator, and the bellows 149 and 150 are arranged in that same general relation.

The construction of the operating bellows, and the air passages connected therewith, is shown in detail in Figs. 30 and 31. Each of the bellows 149 and 150 comprises double bellows, the members 151 of the bellows 149 being rigidly attached to a block 152 which is in turn rigidly attached to a block 153. This block 153 is rigidly attached to the frame of the airplane and has therethrough four air passages 154, 155, 156 and 157 which are in turn connected with the main valve box 170. The tubes or pipes connecting the air passages 154, 155, 156 and 157 with the main valve box 170 are preferably of reinforced rubber construction, such tubes being of a construction particularly adapted for pneumatic work. These tubes should have sufficient rigidity to withstand the unbalanced pressures on the inner and outer surfaces due to the subatmospheric pressure inside the tubes and the atmospheric pressure on the outside thereof. Throughout the pnuematic control the main pnuematic pipes or tubes are of this heavy reinforced construction, while the balanced pnuematic connecting tubes are preferably of lighter rubber tubing, such as is ordinarily used in pnuematic player pianos. The members 159 of the double bellows 149 are rigidly connected, in alignment, as by means of the plate 160, so that any movement of these two members will be in unison. The block 152 has therethrough two passages adapted to register with the passages 154 and 155 of the block 153 and to connect those passages with the interior of the bellows 149. By means of these passages each side of the double bellows 149 may be connected direct with the equalizer 120 through the main valve box 170, the suction, and consequently the vacuum, within each side of the double bellows being thus dependent upon the vacuum within the equalizer and the position of the valves in the valve box 170 controlling the passages 154 and 155. Any variation in the unbalanced pressures upon the bellows, due to variations in the degree of vacuum within the respective sides thereof, will result in a relative compression of one side of the bellows and a relative expansion of the other side, with a consequent movement of the members 159 of the bellows to swing the rudder about its axis. The double bellows 150 also has inclined members 161 rigidly attached to a block 162, which is in turn rigidly attached to two blocks 163 by means of which the block 162, and the bellows 150, is rigidly attached to the block 153 so that it is maintained in substantially the same fixed relation to the airplane as is the bellows 149, the two double bellows, as stated above, being arranged at right angles to each other. The bellows 150 has the aligned and movable members 164 thereof rigidly attached to each other by means of a plate 165 so that these two members move in unison upon compression or expansion of the opposite sides of the bellows. The blocks 162 and 163 have therein passages which register with the passages 156 and 157 of the block 153, such passages leading one into one side of the bellows 150 and the other into the other side thereof. The bellows 150 is connected to the equalizer 120 in the same manner as the bellows 149 and the operation thereof is substantially the same.

To cause the airplane, upon launching, either from its own launching gear or from the launching mechanism shown in Fig. 1, to climb at the desired angle, the elevator 102 should be properly set so that its average angle as it flips up and down in a manner to be described later will give the desired angle of climb of the plane. It would be quite simple of course to set the elevator so as to give the desired angle of climb for the entire distance to be traveled, but, particularly where the distance to be traveled is great, say 50 or 60 miles, it is desirable that the elevator act to cause the plane to reach a desired altitude, after which it is desirable that the elevator act so as to maintain the plane during flight at substantially a uniform altitude. That is, it is preferable that the plane first climb to an altitude at which the desired flying conditions may be met with and that, during the remainder of the flight, it be maintained at substantially that altitude until the desired distance has been traveled. The desideratum therefore is to provide control mechanism whereby the elevator may be at first positioned to cause climbing at the predetermined angle and, after the desired altitude is attained, may then act to maintain the plane at substantially that desired altitude. For securing this positioning of the elevator a combined gyroscope and altimeter control is used.

The mechanism for controlling the angle of climb of the airplane and the altitude at which its flight takes place is shown somewhat diagrammatically in Fig. 6. This control system comprises the elevator 102, not shown in Fig. 6, the bellows 150 for operating the elevator, the equalizer 120 and engine 108, not shown in Fig. 6, for furnishing uniform operating vacuum within the bellows 150, the valve box 170 containing certain valves adapted to vary the operating vacuum within the bellows 150, the balanced pneumatic 295 for actuating the valves in the valve box 170, the gyroscope 179 for controlling the balanced pneumatic so long as the airplane is below a predetermined altitude, and the altimeter 305 and the electrically operated pneumatic valve 302, adapted to take control of the balanced pneumatic so long as the airplane is flying at or above a predetermined altitude.

Figs. 19, 20 and 21 show in detail the construction of the gyroscope used as an element of the control apparatus. This gyroscope comprises a frame 180, somewhat U-shaped, the two arms of the U carrying the upper and lower bearings for the gimbal ring 181. The lower bearing for the gimbal ring comprises a socket member 182, carried by the frame 180, in which is seated a hardened ball 183, the gimbal ring itself carrying another socket member 184, similar in construction to the socket member 182, and adapted to cooperate with the ball 183, and form an upper seat for this ball. This construction gives rise to a simple and yet efficient ball bearing. The upper bearing for the gimbal ring comprises a member 185, threaded through the upper arm of the frame, which carries therein a metallic tube 186. This tube extends downwardly through the member 187 which is carried in the upper portion of the gimbal ring and serves as a bearing for the tube 186, about which the gimbal ring is free to turn. Threaded upon the upper end of the member 185 is a hollow cup 188 having a tube 189 opening thereinto, the tube 189, the interior of the cup 188 and the tube 186 thus constituting in effect a continuous passage. Mounted in the gimbal ring, and intermediate the upper and lower bearings thereof, are two bearings 190, these bearings being located 180° apart and constituting the bearings for the pivots 191 carried upon the rotor casing of the gyroscope. The pivots 191 and the bearings 190 may be of several different constructions, such for example as a sensitive ball bearing. I have found, however, that where long life is not an essential these pivots and bearings may be made of hardened steel. The bearings 190 comprise, as shown, a steel member threaded through the gimbal ring and having a cone-shaped socket in the inner end thereof, nuts 192 being provided to hold the bearings in adjusted position. Obviously wear in these bearings may be taken care of by merely turning up the screws 190 and tightening the lock nuts 192. In order that the bearings 190 may function satisfactorily in the gyroscope the sockets should be carried by the gimbal ring and the pointed pivots by the casing of the rotor element, rather than the reverse. Where the pivot member is carried by the rotor casing, slight displacement of the pivot member relative to the socket has no tendency to throw the casing out of balance, by moving its horizontal axis relative to the distribution of its mass thereabout; but where the socket member is carried by the rotor casing and the pivots by the gimbal ring, displacement of the pivots would result in such shifting of the horizontal axis, thus throwing the casing out of balance about the horizontal axis and rendering the gyroscope inacurate.

Carried upon the outside of the rotor casing is an arcuate valve 195 which is so positioned on the casing as to swing across the lower end of the tube 186 closely adjacent thereto but not in contact therewith upon relative movement of the gyroscope parts about the pivots 190. By means of this construction the effective opening through the tube 186 varies with varying positions of the gyroscope casing and gimbal ring about the horizontal axis.

The gyroscope casing, for purposes of easier manufacture and assembling, is made in two parts 200 and 201. The part 200 carries thereon a hub portion 202 having a passage therethrough adapted to receive a threaded member 203 which has in its inner end a bearing element 204. The part 201 has upon the outer side thereof a hub 205 having a threaded member 206 carrying a bearing element 207 therein, the structure of these parts being the same as corresponding parts on the member 200. Each of these bearings should be well lubricated and oil ducts 208 are provided to permit of such. Mounted within the two parts of the casing is a shaft 210 carrying the rotor element 211 thereon. As shown this shaft is in metal to metal contact with the parts of the casing. Greater efficiency and longer effective life may be secured by mounting the shaft in ball bearings, but the construction shown functions satisfactorily in an apparatus such as disclosed. The shaft has each of its ends provided with an extension 212 adapted to cooperate with the bearing elements 204 and 207. These bearing elements may be made of different materials, but I preferably use a hard fiber, such as the type known in the trade as "white horn fiber". The bearing members 203 and 206 are made adjustable so that all wear in the bearings may be compensated for, it being practically essential for accurate operation that there be no play whatsoever in these bearings. The desired adjustment may be secured by turning the bearings up the requisite amount and locking them in place with the nuts 213.

The bearing carrying members 203 and 206 have threaded extensions thereon carrying small adjustable weight members 214, adapted for securing balance of the casing, and the parts carried thereby, about the horizontal axis. Associated with each of the weight members 214 is a spring locking-clip 215 for holding such weight members in adjusted position. Extending inwardly from the casing member 201, and substantially coaxial with the hubs 202 and 205, is an extension 216 adapted to carry the coils 217 of the gyroscope motor. These coils are wound upon the spool 218 which is adapted to be slipped in place over the extension 216. This gyroscope, as shown, consists essentially of a three-phase induction motor in which the rotor element, which consists of a cup-shaped metal wheel, is mounted upon the shaft 210 and is adapted to rotate around the coils 217. Thus it is seen that the gyroscope motor elements operate in effect as would the ordinary squirrel cage, three-phase, induction motor. The current for operating the gyroscope is supplied by the generator 110, as described below, which is adapted to furnish alternating current for this purpose. The construction of the gyroscope motor elements and of the source of current therefor should be such as to turn the rotor of the gyroscope about eleven or twelve thousand revolutions a minute. This speed is preferable but, of course, not essential. Modified apparatus for driving the rotor element of the gyroscope may be used if desired, but the construction described has been found to operate very satisfactorily in control apparatus for aerial torpedoes of the type described. The current for operating the gyroscope is led from the generator to the gyroscope by means of conductors 508, 509, 510, which conductors are attached to the gyroscope frame at 218ª. Running along the upper arm of the gyroscope frame are the insulated conductors 515 and 516 which lead to the gimbal ring adjacent the bearings 190. The conductors 515, 516 are connected respectively to two of the conductors 508, 509, 510, the third one of the conductors 508, 509, 510 being grounded to the frame 180 at 218ᵇ. Carried by the bearings 190 are two arms 219 of fibrous insulating material (see Fig. 19). Attached to the outer end of each of these arms is a spring 220, which is connected by means of the conductor 220ª to a similar spring 220 which is attached to an arm 221 carried by the rotor casing, such arm being of the same material as the arm 219. The electric conductor 220ª is composed of a very fine flexible wire conductor, that end of each of the conductors 220ª adjacent the arms 219, being electrically connected to one of the conductors 515, 516 leading from the gyroscope frame to the gimbal ring. The wires 220ª need not be insulated, and are constructed to offer substantially no resistance to the movement of the gyroscope about its axes. The inner ends of the wires 220ª are connected to insulated conductors 222 which in turn are connected each to one of the coils within the gyroscope casing. Also carried by one of the bearings 190 is an arm 223 composed of a material which is a conductor. Carried by this arm is a spring 224 similar in construction and function to the springs 220, the other end of this spring being connected directly to the rotor casing through the very flexible wire 224ª which is similar in construction and function to wires 220ª. Also attached to the rotor casing is a conductor 225 the other end of which is attached to that one of the coils not connected to the conductors 222, this third coil being thus connected through the gyroscope frame to that one of the conductors 508, 509, 510 which is grounded to the frame.

Carried by the gimbal ring is an arcuate shaped valve member 230. Carried by the frame member and extending upon opposite sides thereof are two arms 231. In the outer end of each arm is a tube 232 the upper end of which terminates in a horizontal plane which is closely adjacent to, but does not contact with, the plane defining the lower face of the arcuate shaped member 230. The member 230 as shown in Fig. 20, and somewhat diagrammatically, in Fig. 18 is so arranged that the ends thereof terminate adjacent the open ends of the tubes 232, the relationship being such that when the gyroscope is in normal position the open end of each tube is partly obstructed, the effective opening through each tube being the same. From this construction it is quite obvious that as the airplane tends to move the frame 180 about the vertical axis of the gyroscope, the open ends of the tubes 232 will be caused to move, in opposite directions, relative to the normally stationary arcuate member 230 to increase the effective opening through the one tube and decrease the effective opening through the other tube. As shown most clearly in Fig. 18 the open end of the tube 232 is preferably in the form of a long narrow slit. The open end of the tube 232 need not necessarily be in the form of a slit, but this specific type of opening seems to give the most accurate control of the effective opening through the tube, and consequently seems to give the most satisfactory operating conditions.

As shown in Fig. 21, the gyroscope frame carries therein a sleeve 235 having a passage 236 therethrough adapted to receive the slidable, or plunger, member 237 which is normally urged by the spring 238 outwardly, that is away from the gyroscope. This plunger member has in its inner end a socket 239 adapted to receive, in locking relation, either of the correspondingly shaped free ends 240 of the members 203 and 206. Intermediate the ends of the member 237 is a groove 241 so positioned that when the member 237 is in locking position, such groove is inside the frame. Adapted to cooperate with the groove 241 is a bifurcated key 242 whereby the member 237 may be locked in inner extended position with one of the pointed ends 240 held in the socket 239, to hold the gyroscope in any predetermined adjusted position. The passage 236 through the sleeve 235 is arranged eccentrically therein to permit of proper positioning of the member 237 with reference to the gyroscope, so as to permit of locking the gyroscope in any predetermined position.

Carried by the part 209 of the gyroscope casing is a member which is arranged with its axis parallel to the vertical axis of the gyroscope, said member including a threaded stem 245, which stem carries thereon a threaded self-locking nut 246. Adjustment of this nut vertically upon the threaded member 245 will cause shifting of the center of gravity of the gyroscope, such nut being used to bring the gyroscope into complete balance about its horizontal axis. Carried by the gimbal ring is a threaded member 247 arranged perpendicular to the horizontal axis of the gyroscope. Mounted upon this threaded member is a cooperating self-locking nut 248 adjustment of which nut tends to shift the center of gravity of the gyroscope to bring it into complete balance about its vertical axis.

Mounted upon the rear end of the instrument board 126 is the main valve box 170. This valve box as shown in Figs. 22 and 23, comprises a main inner chamber 250 into which leads the pipe 124 from the equalizer 120. Opening through the top of the main valve box, and connecting with the main chamber 250 are four passages 251, 252, 253 and 254. Leading off respectively from each of these passages are passages 255, 256, 257 and 258 which passages are adapted to be connected respectively with the passages 155, 154, 156 and 157 of the bellows block 153 (see Figs. 6, 18 and 31) and thus to be connected respectively to the opposite ends of the main operating bellows 149 and 150. Mounted in each of the passages 251, 252, 253 and 254 is a double acting pneumatic valve, these valves being numbered respectively 273, 274, 275, 276. The valves 273 and 275 are identical in structure. Each of these valves comprises two opposed discs 277 carried by the valve stem 278 which is supported in the guide members 279 and 280. As clearly shown in Figs. 23 and 24 the valve discs 277 are so positioned that one of them is within the main chamber 250, while the other is entirely outside the valve box. It is thus seen that these two valve discs are adapted when in one position, the position shown in the drawing, to connect the passages 251 and 253 to the main chamber 250 and to cut these passages off from the atmosphere, and when in the other position to connect these passages with the atmosphere and to cut off connection thereof with the main chamber 250.

The valves 274 and 276 are identical in construction. Each of these valves also consists of a double acting pneumatic valve, but as clearly shown in Figs. 23 and 25, each consists of a double seat valve carried upon the stem 281 which is movably mounted in the supporting members 282. Each valve is adapted to move between the members 283 which are mounted within the passages 252 and 254. In the position illustrated the valves are resting upon the lower seat members 283 and the passages 252 and 254 are thus connected to the atmosphere. When so positioned that the valves contact with the upper seat member the passages 252 and 254 will be connected to the main chamber 250 of the valve box. The valve discs and stems, and other similar parts of the valve structure, are preferably made of wood to give a very light construction, but other materials might be used for constructing these valves if found desirable. Each of the valve discs, as shown, has that face adapted to cooperate with the valve seat covered with soft leather, though of course other material for facing the valve might be used if desired. Attached to the lower end of each of the valve stems is a foot member 260 adapted to rest upon the diaphragm 261, preferably of thin leather, each of which diaphragms forms a cover for one of the chambers 262, 263, 264 and 265. As shown in Fig. 23, the two chambers 263 and 264 are connected by means of passage 266 and branch passages 267. The passage 266 is connected at one end with the chamber 250 by means of a passage 268, the disk 269, which has a small bleed opening therethrough, being inserted in the passage 266 so that during operation of the device, that is when a vacuum is being maintaned in the chamber 250, the amount of air which may pass from the passage 266 into the chamber 250 will be so small it will not interfere with the vacuum in chamber 250, it being remembered that the equalizer 120 is adapted to maintain a uniform vacuum within the main pneumatic system including the chamber 250. Connected to the chamber 262 is a passage 270 which is in turn connected to the chamber 250 by means of a passage 271 shown most clearly in Fig. 24. Leading into the chamber 265 is a passage 272 which is connected to the interior of the chamber 250 by a passage 271$^a$, the arrangement of the passages 270 and 272 and passages 271 and 271$^a$ being the same. Each of the passages 270 and 272 has a small bleed disk 269 inserted therein, as in the case of the passage 266. Leading into the chamber 250 is a passage 284. Each of the passages 266, 270 and 272 is connected, through certain apparatus described below, with the atmosphere, the passages 270 and 272, as shown in Figs. 4 and 18, being connected with each other outside the valve box by means of tubes so that conditions within the chambers 262 and 265 will be subjected to the same varying influences. The valves 273 and 274 are thus adapted to function in unison, while the valves 275 and 276 are also adapted to function in unison. In the position shown, that is with both valves in lowermost position, the passage 251 is connected to the main chamber 250 while the passage 252 is connected to the atmosphere. Upward movement of the valves 273 and 274 would result in connecting the passage 251 to the atmosphere and the passage 252 to main chamber 250. The action of the valves 275 and 276 is similar. That is to say, as shown, the passage 253 is connected to the main chamber 250 while the passage 254 is connected to the atmosphere, both valves being shown in lowermost position. Movement of the valves into upper position would result in connecting the passage 253 to the atmosphere and the passage 254 to the main chamber 250.

As a result of this construction, whenever atmospheric air is permitted to enter passage 266 it will raise the pressure under the two central diaphragms 261 sufficiently above the pressure in vacuum chamber 250 to raise valves 275 and 276 to their up position, thus connecting tube 257 to the atmosphere and tube 258 to the vacuum chamber 250. (See Figs. 23 and 6.) If however passage 266 now be closed to the atmosphere the atmospheric air trapped under the diaphragms 261 will quickly leak out into the vacuum chamber 250 through the small bleed holes in disks 269 until the pressures on both sides of the diaphragms are balanced, whereupon the valves 275 and 276 will be drawn to their down positions (shown in Fig. 23) by the vacuum in chamber 250 and the outside atmospheric pressure on top of the valves 275 and 276. This of course again connects tube 257 with vacuum chamber 250 and tube 258 to the atmosphere. The two outer valves 273 and 274 are in the same manner drawn to their up or down positions together by opening or closing to the atmosphere the two passages 270 and 272 which are branches of the single passage 342 (see Fig. 18).

From this construction it is thus seen that when one side of the operating bellows 149 or 150 is connected to suction through the main chamber 250, the other side is connected to the atmosphere so that one side of the bellows will collapse as the other expands. In this way positive operation of the control members actuated by this double bellows is secured.

It is thus seen that to operate the elevator and rudder controls of the airplane proper actuation of the valves in the main valve box 170 is caused, which in turn causes an unbalancing of pressures upon the main operating bellows 149 and 150 to move the rudder or the elevator, or if desired both at once, to bring about the desired control of the airplane. For causing proper actuation of the valves in the main valve box pieces of mechanism, which for purposes of convenience may be termed "pneumatic relays", are employed, which pneumatic relays are associated with the control elements upon the instrument board and are adapted to cause variations of pressure within the chambers 262, 263, 264 and 265 to cause a functioning of the main operating bellows. As shown, particularly in Figs. 4 and 6, the passage 266 is connected to a tube or pipe 285 which terminates in the top part of the central stationary element 286 of a pneumatic relay.

These pneumatic relays are small balanced pneumatics or bellows, adapted to operate upon very small unbalanced pressures. As shown in detail in Figs. 26, 27, 28 and 29, each of the pneumatic relays or balanced pneumatics is of the same construction and comprises a central stationary portion 286 having hinged movable portions 287 connected at one end thereof. The movable elements 287 are rigidly attached to each other, as by means of the connecting rods 288 whereby movement of the two members 287 takes place in unison so that when one side of the balanced pneumatic tends to collapse the other side tends to open. Carried by one of the movable members 287 is an adjustable valve 289 adapted to cooperate with the open end of the tube 290, which tube is adapted for receiving the tube or pipe leading from the passage 266, or from 270 and 272 of the main valve box. As described above during operation of the device there is a continuous flow or leakage of air through the passages 266, 270 and 272 into the chambers 262, 263, 264 and 265 and thence through the passages 268, 271 and 271$^a$ into the main chamber 250 of the valve box 170. With each of the passages connected to a tube 290 of a balanced pneumatic, and with the valve 289 cooperating therewith in properly adjusted position, it is obvious that any movement of the movable members 287 will cause a change in the amount of air that may leak into these passages and so into the chambers 262, 263, 264 and 265. That is to say if the balanced pneumatic is normally set so that the effective opening through the tube 290, as determined by the position of the valve 289, is just sufficient to balance the leakage through the bleed holes in disks 269, the pressures upon opposite sides of the diaphragms 261 will be so balanced that no movement of the main valves will occur and they will remain in their down position. If, however, the movable members 287 for any reason tend to move so as to bring the valve 289 further from the end of the tube 290, there will be an increase in the effective opening through such tube with a corresponding increase in the quantity of air tending to pass into the chambers 262, 263, 264 and 265. There will be, therefore, an unbalancing of the pressures upon opposite sides of the diaphragms, with a consequent raising to the up position of the main valves cooperating with the chambers in which such unbalanced pressures exist.

Leading into the stationary member 286 of each balanced pneumatic is a passage 291 which connects to branch passages 292 which passages in turn lead one into one side of the balanced pneumatic and the other into the other side thereof, each of these passages having inserted therein a disk having a small bleed hole therein similar in structure to the disks 269 described above. Each of the passages 291 is adapted to be connected to the passage 284 in the main valve box which in turn opens into the main chamber 250. It is thus seen that during operation of the controls there is a tendency to withdraw the same definite quantity of air from each side of the balanced pneumatic, with an ensuing tendency to maintain uniform internal pressures, or vacuums, within the opposite sides of such pneumatics. Also located in the stationary member 286 of each balanced pneumatic are two passages 293 and 294 one of which opens into one side of the balanced pneumatic and the other of which opens into the other side thereof. Each of the passages 293 and 294 is connected, through suitable tubes, the effective openings through which are controlled by the various control instruments, to the atmosphere. If the effective opening through each of the tubes connected to these two passages is the same the same amount of air will flow into the opposite sides of the balanced pneumatics and since the same amount flows from each side of the balanced pneumatic through the passage 291, the pressures upon opposite sides of the pneumatics will tend to compress each side thereof with an equal force. Consequently these two compressive forces will be balanced and, inasmuch as the movable members 287 are constrained to move in unison, no motion will result. If, however, the effective openings through the tubes connected with the passages 293 and 294 are varied so that such effective openings are no longer equal, it is obvious that a greater amount of air will be permitted to pass into one side of the balanced pneumatic than into the other side, and, there will be immediately an unbalancing of the pressures tending to move the two movable members 287 and a consequent movement of those members to carry the valve 289 closer to or further from the open end of the tube 290, which will in turn cause actuation of the corresponding main valves.

As shown most clearly in Figs. 4, 6 and 18 two of these balanced pneumatics are carried upon the control board one of which, designated generally 295, has the tube 290 thereof attached to the tube 285 which is in turn connected to the passage 266 and is thus adapted to actuate the main valves controlling operation of the elevator. Connected to the passage 284 of the main valve box is a tube 296 which is divided into a plurality of branches each of which connects with the passage 291 in one of the balanced pneumatics. The passage 294 of the balanced pneumatic 295 has a tube 297 connected thereto, the free end of which is open to the atmosphere to constitute a bleed port whereby atmospheric air may pass into that side of the pneumatic into which the passage 294 opens (see Fig. 6). The free end of this tube is slit and internally threaded, a valve plug 298 being threaded thereinto whereby the effective opening through the tube 297, and consequently the amount of air which may pass therethrough, may be accurately controlled (see Fig. 4). Connected to the passage 293, which leads into the other side of the balanced pneumatic 295, is a tube 299 which, a short distance from the pneumatic, is split into two branches 300 and 301. The branch 300 terminates in an open end which has associated therewith the valve 302 to be later fully described whereby the opening through this branch 300 may be controlled. The other branch 301 has its free end attached to the tube 186 associated with the top bearing of the gyroscope, as shown in Fig. 21.

As described above the gyroscope casing carries upon the top thereof a valve member 195 adapted to control the effective opening through the tube 186. Presuming that the valve 302 is so positioned as to completely close the open end of the tube 300, the balanced pneumatic 295 may be maintained in balanced relation by properly positioning the valve 195 and the open end of the tube 186 relative to each other, and properly setting the valve 298 in the tube 297 to make the effective opening into each of the tubes 297 and 299 the same. This specific mechanism is adapted for controlling the angle of climb of the airplane during launching thereof, or in fact at any time when the airplane is flying at less than the predetermined altitude. In launching the airplane, as stated above, it is desirable that a predetermined angle of climb shall not be exceeded. In order to secure this angle of climb the gyroscope is so set as to its vertical position that when the plane is climbing at the desired angle the effective opening into the tube 299 and into the tube 297 is the same. During flight of the plane the desired angle of climb will then be maintained so long as the effective opening into these two tubes remains the same. If the airplane tends to climb at too small an angle there will be no variation in the vertical position of the gyro casing, but the frame of the gyro, which is rigidly attached to the instrument board, will tend to follow any movement of the airplane from the desired angle of flight and will swing about the gyro casing in such a way as to cause the free end of the tube to vary its position relative to the valve 195 to decrease the effective opening through such tube. (See Fig. 6.) Inasmuch as the opening into the tube 297 remains constant, and such movement of the gyro causes a decrease in the effective opening into the tube 301, it is obvious that the pressures tending to move the two members 287 of the balanced pneumatic in opposite directions will immediately become unbalanced and will move these members in such direction as to move the valve 289 further from the open end of the tube 290. This will allow the inflow of excess air into the tube 285 and passage 266. The pressure upon the opposite sides of the diaphragms 261 associated with the chambers 263 and 264 will in turn become unbalanced and the valves 275 and 276 associated with the passages 253 and 254 will move upwardly from the position shown in Fig. 23 to connect the passage 257 with the atmosphere and cut off its connection with the chamber 250 and to connect the passage 258 with the chamber 250 and cut off its connection with the atmosphere. As a consequence the main operating bellows 150 will immediately respond, the side associated with the tube 257 expanding to cause shifting of the elevator to give a different angular positioning thereof and thus vary the angle of climb of the airplane. And if the airplane tends to climb at an angle greater than that predetermined as desirable, and for which the control apparatus is set, it is obvious that the reverse movement of the frame of the gyro about the gyro casing will take place with a consequent increase in the effective opening into the tube 301 and such an unbalancing of the balanced pneumatic and of the valves associated therewith, as will cause movement of the elevator in the opposite direction.

The gyroscope, however, is normally adapted to control the elevator until the plane reaches the desired altitude. For controlling the elevator after the plane has attained the desired altitude a control mechanism is employed which is responsive to variations in atmospheric pressure, such variations in atmospheric pressure being of course attendant upon varying altitudes. This controlling mechanism comprises an altimeter designated generally by the numeral 305. This altimeter comprises a closed metallic vessel 306, which, in the modification shown in Figs. 7 and 8 of the drawing, is made of thin corrugated metal, its construction being substantially identical with that employed in the pressure responsive elements used in the conventional aneroid barometer. The member 306 is carefully sealed and may be filled with a gas under any desired pressure, the pressure preferably being sub-atmospheric. This diaphragm member 306 is mounted upon a base 307 which is in turn rigidly secured to the instrument board. Mounted upon the upper surface of the diaphragm is a post 308, the upper end of which passes through a spring 309, which is held in position by means of a key 310. This spring 309 is in the form of a U-shaped member which has one arm attached to the post 308 and the other arm mounted in a slot in the member 311 as shown clearly in Fig. 8. The member 311 has threaded therethrough two adjusting screws 312 both of which screws pass through the main part of the member 311 and are substantially in alignment, along a line substantially parallel to the back 313 of the spring 309. Extending substantially at right angles to the member 311 and at one end thereof is an arm 314 the outer end of which carries an adjusting screw 315. The lower end of this screw is adapted to set in a cooperating hole in the base 307, and it has an extension 316 thereon which constitutes, with the cooperating face of the base, a ball and socket joint. The adjusting screws 312 have their lower ends seating upon the base. Attached to the spring 309 and extending substantially at right angles to the back thereof is an arm 317, the outer free end of which carries a contact element 318 adapted to cooperate with the adjustable contact element 319 which is mounted in the upward extension 320, carried by the base of the altimeter. The element 319 is threadly engaged in the upward extension 320 and carries an adjusting disc 321 upon the upper end thereof whereby the contact element 319 may be moved longitudinally. The upper face of the adjusting disc carries graduated indication marks, shown plainly in Fig. 7, whereby the contacts carried by the altimeter may be so adjusted that they will close when any predetermined altitude is reached, that is to say when a pressure corresponding to that predetermined altitude is reached. Also carried by the upward extension 320 is a pointer 322 adapted to cooperate with the adjusting disc 321 to permit more accurate setting of that disc. Associated with the contact element 319 and in electrical contact therewith is the electrical connection 323. The contact element 319 is electrically insulated from the upward extension 320 by means of the insulating material 324. The contact element 318 is connected, by means of the conductor 325 which is attached to one of the connecting screws 326 which holds the altimeter to the instrument board, to one terminal of the electromagnet 335. The contact element 319 is connected by means of the connector 323 and a conductor 327 to the electromagnet 335, through the direct current side of the generator 110.

Two of these electromagnets are used in the control mechanism, the function of each of them being to operate a valve adapted to control the effective opening through a tube leading to a balanced pnuematic. These electromagnets are identical except for one detail of construction, and consequently only one figure, Fig. 9, is used for illustrating these details. The electromagnet illustrated comprises a conventional coil and core designated generally 329, one terminal of the coil being attached directly to the direct current side 500 of the generator 110 and the other terminal being attached to a contact element carried by some one of the controlling elements and adapted to close the circuit between such other terminal of the coil and the direct current side of the generator to thus energize the coil. Pivotally mounted upon a frame 330 carried by the electromagnet is an armature 331 the upper end of which carries an adjustable valve 332 adapted to cooperate with the open end of a pneumatic tube which is in turn connected to one of the balanced pneumatics. The armature has attached thereto, a spring 333 tending to hold it in such position that the valve 332 will be held closed when the magnet is not energized. This spring 333 is attached to an adjusting screw 334 whereby the tension of the spring may be varied to insure proper seating of the valve 332.

The conductors which lead off from the contact elements 318 and 319 of the altimeter pass underneath the instrument board, in any conventional manner, and are connected as described above to terminals of the coil of the electromagnet 335. This magnet controls the valve 302 which is normally held in such position as to close the branch 300 of the tube 299. (See Fig. 6.) Upon closing of the contacts 318 and 319, however, the electromagnet 335 will be energized and will attract the armature thereof thus moving the valve 302 to connect the branch tube 300 to the atmosphere.

Surrounding the core of the magnet 335, and interposed between the core and the coils thereof, is a sleeve 336 of a conducting material, such as copper. In actual practice the contacts 318 and 319, due largely to vibration, open and close with too great a frequency. It is desirable that the valve 302 function at a much slower rate, not more, say, than ten times a second. The sleeve 336 tends to maintain the actuation of the valve 302 within this desired limit. When the contacts 318 and 319 open or close eddy currents are build up in the sleeve tending to assist magnetization or to resist demagnetization as the case may be. Therefore the magnetic field built up in the electromagnet and tending to actuate the armature will be the resultant of the magnetizing and demagnetizing action of the eddy currents superimposed upon the magnetizing and demagnetizing action due to the flow and non-flow of current through the coil, that is, the vibrations of the contacts will be integrated. Consequently the armature will be actuated only if the resultant magnetization built up during a definite time interval is sufficient to cause such actuation. In the apparatus described the sleeve 336 is preferably of copper and has a thickness of about one-eighth of an inch. The dimensions of the sleeve would of course vary according to the conditions existent. And, too, materials other than copper may be used if desired. When the plane is launched, it is thus seen, that the gyroscope, through the valve 195 carried upon the top of the casing thereof, and the balanced pneumatic 295, will actuate the main valves 275 and 276 controlling the bellows 150 to thus control the setting of the elevator whereby the angle of climb will be regulated. Until the airplane reaches the predetermined altitude, the gyroscope will be alone effective in causing actuation of these main valves through the balanced pneumatic 295. As the airplane climbs, however, the external pressure upon the diaphragm 306 will decrease and this diaphragm will, therefore, tend to expand, expansion of the diaphragm acting through the post 308 permitting distortion of the spring 309 to bring the contact element 318 toward the contact element 319. When the predetermined altitude is reached the expansion of the diaphragm, due to the decreased atmospheric pressure thereon, and the consequent deflection of the spring 309 will be sufficient to bring the contacts 318 and 319 together. This will result in energizing the electromagnet 335 with a consequent moving of the valve 302 so as to open the tube 300 to the atmosphere. Obviously this will unbalance the pneumatic 295 to raise the main valves 275 and 276 and cause actuation of the elevator tending to nose the airplane downwardly. Since the opening through valve 302 is large enough to unbalance the pneumatic 295 independently of the position of the gyroscope valve 195, the plane will be nosed downwardly and will continue to fly downwardly until it loses enough altitude to open contact points 318, 319 whereupon valve 302 will close and the gyroscope again assumes control of the plane. Since the gyroscope control causes the plane to ascend at a predetermined angle of climb as previously described herein, the plane will again start to climb until contact points 318, 319 are again opened and the operation is repeated. Thus it is seen that the plane will maintain the desired altitude by continuing to dip slightly above and below this altitude, the frequency of these dips depending upon the amount of lag in the control apparatus and the time it takes for the elevator to turn the plane about.

When the airplane has risen into the air it immediately becomes essential that its direction of flight be controlled. For securing such directional control mechanism is provided adapted to operate the rudder 101, such mechanism comprising the control cables 146, the bellows 149 and apparatus for causing actuation of the bellows to swing the rudder in the desired direction.

For effecting proper actuation of the rudder control bellows, use is made of the gyroscope 179. As described above, the gyroscope gimbal ring carries upon the base thereof an arcuate member 230 which is adapted to cooperate with the open end of the tubes 232, which are carried by the transverse extensions 231, attached to the lower arm of the frame 180, relative displacement of the gyroscope frame 180, about its vertical axis, relative to the gimbal ring causing variations in the effective openings of the tubes 232. (See Figs. 18 and 20.) The operation of this control mechanism depends for its efficacy upon the tendency of the gyroscope when once set in a definite position to maintain that definite position. The gyroscope is set with its axis of rotation parallel to the desired line of flight. The gimbal ring is movable with the gyroscope casing, so far as movement about a vertical axis is concerned but the frame of the gyroscope, which is attached to the airplane, is adapted to rotate around the vertical axis of the gyroscope and gimbal ring. The gyroscope having been properly set, therefore, any deviation of the airplane from the desired direction will cause the frame and the tubes 232 carried thereby to move relatively to the arcuate member 230 to vary the effective opening through such tubes.

As clearly shown in Fig. 4, and also as shown somewhat diagrammatically in Fig. 18, the tubes 232 are connected, by means of tubes 340, each to one side of a balanced pneumatic 341. This balanced pneumatic is substantially identical in structure with the balanced pneumatic described above, and details of which are shown most clearly in Figs. 26, 27, 28 and 29. This balanced pneumatic has the passage 291 thereof connected by means of the tube 296 and the passageway 284 to the main chamber 250 of the main valve box 170. The tube 290 of the pneumatic 341 is connected by means of the tube 342, which at its other end is divided into a plurality of branches, with each of the passages 270 and 272. The adjustable valve 289, carried by the movable elements of the balanced pneumatic is adapted, as described above, to control the effective opening into the tube 290, and thus to control the quantity of air which may pass through such tube into the passages 270 and 272 and thence into the chambers 262 and 265. Inasmuch as the chambers 262 and 265 are connected to the main chamber 250 of the valve box by means of bleed passages having a constant orifice therein, so that, under the uniform vacuum which exists in the main chamber 250, there will be a definite leakage of air from the chambers 262 and 265 into the main valve box chamber, any movement of the valve 289 to vary the effective opening into the tube 342 will result in an unbalancing of the pressures upon the opposite sides of the diaphragms 261 to thus cause actuation of the main valves 273 and 274 controlling the passageways 255 and 256.

The gyroscope having been set with its rotational axis parallel to the desired line of flight (see Fig. 18), it is obvious that any deviation from that line of flight will cause a variation in the effective opening into the tubes 232 and 340 with a consequent unbalancing of the pneumatic 341 to cause such actuation of the main valves 273 and 274 cooperating therewith as will give rise to unbalanced operating pressures upon the double bellows 149 to swing the rudder for the purpose of bringing the airplane back to the desired line of flight.

In the use of an aerial torpedo one of the principal desires would be to cause the torpedo to land upon some predetermined objective. In order to secure this condition not only should the direction be controlled but also the distance. For securing distance control use is made of the mechanism illustrated somewhat diagrammatically in Fig. 10 in which mechanism responsive to air speed and carried upon the ship is connected to a subtraction counter, adapted after a predetermined number of operations to perform some step adapted for causing the plane to land. This mechanism, which for convenience is called an "air log", comprises the fan 350, mounted in the holder 351, which has its free end 352 adapted for attachment to some portion of the airplane where the fan will be responsive to the air flow past it resulting from the movement of the airplane during its flight. The "air log" is preferably attached to one of the outer struts, between the wings, as shown in Fig. 3, the bracing wires 105 constituting conductors for connecting the air log to the generator 110. The fan 350 is mounted upon a shaft 353 the ends of which are preferably pointed and have bearing upon the adjustable bearing members 354, these bearing members being adapted for adjustment to compensate for any wear of the pointed ends of the shaft 353 which cooperate with them. One end of the fan shaft is extended into the chamber 355 formed in the frame carrying the fan shaft, the wall of which chamber carries one of the bearings 354 which cooperates with this extended end of the fan shaft. The extended portion within the chamber 355 has a worm 356 cut therein with which meshes a gear 357. (See Figs. 10 and 15). This gear carries thereon a hub portion which is cut away on one side as at 358. Pivotally mounted upon the shaft 359 which extends transversely across the chamber 355 is a contact element 360 having one end adapted to contact with the cut-away hub of the gear 357 and having a spring 361 attached thereto for urging the said end of this contact element against the hub of such gear. The other end of the element 360 carries a contact member adapted under certain circumstances to contact with the contact element 362 which is adjustably mounted in the wall of the chamber 355, such element being insulated from the wall of the chamber by means of a sleeve of any desired type of insulating material 363. Attached to the contact element 362 is a connector 364. As the air fan rotates about its shaft the worm 356 will cause rotation of the gear 357 and the cutaway portion carried thereby, and as this cutaway portion passes under the extended arm of the contact member 360, the spring holding this extended arm against the hub portion will snap it into the cutaway portion thus causing the contact element 360 to contact with the element 362. That is to say, once during each revolution of the gear 357 the contact elements 360 and 362 will be brought into contact with each other to close the circuit in which they are included. As shown somewhat diagrammatically in Fig. 10, the contact element 360 is connected through the conductor 365 with the direct current side of the generator and so with the ignition circuit of the engine. This conductor may be attached directly to the contact element or, what is preferable, may be attached to any part of the frame of the air fan, the element 360 being, of course, in electrical contact with the frame of the fan. The contact element 362 is connected by means of the conductor 366 to one terminal of the electromagnet 367, the other terminal of the magnet being connected to the direct current side of the generator 110. This connection may be made by means of positive conductors or it may be made through grounding one terminal of the direct current generator and one terminal of the electromagnet. The electromagnet used in this distance control mechanism is identical in construction with that described above and illustrated particularly in Fig. 9, except that it has no sleeve 336. As shown the electromagnet 367 carries a valve 368 adapted to control the effective opening into the tube 369 which tube leads into the chamber 371 located in the distance control valve box 370. This valve box 370 comprises a main vacuum chamber 372 which is connected by means of the tube 373 with the equalizer 120. Passing through the upper part of the valve box 370 is a passage 374 in which is located a double acting valve 375 identical in structure with the valves 274 and 276 shown in the main valve box 170. As is the case with the valves above referred to, the valve 375 carries a base 376 adapted to rest upon the diaphragm 377, which separates the chamber 371 from the chamber 372. When valve 368 is closed there is no substantial difference in pressures upon opposite sides of the diaphragm and the vacuum in chamber 372 will hold valve 375 down on its lower seat. If the pressures within chambers 371 and 372 become unbalanced an appreciable amount, by the opening of valve 368, so as to cause a preponderating pressure upon the lower side of diaphragm 377, the valve will be urged upwardly to set upon its upper seat. Leading off from the passage 374 is a tube 378 which leads into the interior of the bellows 379.

This bellows, as shown in Fig. 16, is supported by means of a frame work 380, the upper member 381 thereof being rigidly attached to the frame work, and the lower or movable member 382 thereof being hingedly connected to the member 381, and normally held in expanded position by spring 383. Carried upon the shaft 385 which extends through the extensions 386 of the supporting member 380 is a plurality of counter wheels 387. These counter wheels are substantially identical in construction each wheel comprising a cup shaped member having a flange 388 thereon, the periphery of which is knurled or corrugated to permit of manual setting. Rigidly attached to each of the counter wheels is an extension 389 having a series of teeth 390 around the periphery thereof. Each of these toothed extensions has the same number of teeth thereon, and each of the cup shaped wheels 387 carries a series of figures corresponding to said teeth. As shown, each of the wheels 387, except that one at the extreme right, has these teeth numbered from zero through nine. The wheel at the extreme right has two sets of designating numbers, each set being 8, 6, 4, 2, 0. In the mechanism herein illustrated each of these numbers represents yards, a zero associated with each numeral being omitted so that each set of numbers really represents 80, 60, 40, 20, 00 yards. It is thus seen that each half rotation of the wheel represents one hundred yards and each complete rotation two hundred yards. Each of the toothed extensions 389 also has therein a slot 391 the wheel at the extreme right having two such slots. Pivoted upon the outer ends of the shaft 385 is a stirrup member 393. Extending through the side arms of the stirrup member is a shaft 394 upon which is mounted a member 395 which has a plurality of fingers 396 extending outwardly therefrom, each of these fingers being adapted to cooperate with one of the toothed extensions 389. Upward movement of the stirrup 393 tends to cause the fingers 396 to contact with the teeth 390 to cause rotation of the wheels carrying such teeth. Rigidly connecting the movable member 382 of the bellows to the stirrup member 393 is a rod 397 whereby closing movement of the bellows will cause a rocking of the stirrup member about the shaft 385 tending to bring the fingers 396 into contact with the teeth 390 to cause rotation of the wheels 387 about the shaft 385. Mounted upon the shaft 394 is a spring 398 connected at one end to the under side of the member 395, and adapted to urge that member into such position as to bring the fingers into register with the teeth 390, and attached at the other end to the stirrup. Also carried in the upward extensions 386 is a shaft 400 upon which are mounted a plurality of locking dogs 401 normally held pressed against the teeth 390 by means of the spring 402. These locking dogs are adapted to permit rotation of the toothed members, and the wheels connected therewith, in one direction, but to prevent reverse rotation thereof. The fingers 396 are so arranged that no more than one of these fingers will ordinarily coact with the teeth 390 at the same time. That is the ends of these fingers are arranged in different planes so that, for example, when the finger at the extreme right, of Fig. 17, is in contact with the teeth cooperating therewith, the other three fingers will be held out of contact with the teeth with which they are adapted to cooperate. Upon actuation of this device, therefore, it is obvious that movement of the stirrup will not cause any movement of the other wheels so long as the finger at the extreme right, is in contact with the teeth 390 with which it is adapted to cooperate. It will be noted, however, particularly in Fig. 16, that each of the wheels has therein a groove 391 which is substantially deeper than the notches constituting the teeth 390. The arrangement of the fingers 396 is such that, for example, when the finger at the extreme right falls into the groove 391 upon the wheel with which such finger cooperates, the second finger from the right will then be brought into contact with the teeth upon the wheel with which it is adapted to cooperate. Upward movement of the stirrup under such conditions will cause a forward movement of the wheel at the extreme right and also a forward movement of the wheel to the left thereof. From this description it is obvious that each wheel to the right, as the device is disclosed, must make a complete revolution, before the wheel immediately to the left thereof will be caused to advance one notch. It is quite evident that this type of mechanism is adapted either for addition or subtraction depending upon the arrangement of the figures relative to the direction of rotation of the wheels.

Also mounted upon the shaft 400 is a contact element 403 which is adapted to cooperate with the contact 404 carried upon an extension 405 of the supporting member 380. This element 404 is insulated from the extension 405, and the other structure of the counter mechanism, by means of insulating material 406. The contact 404 is connected to a conductor 407 which is in turn connected to the ignition system of the engine, either directly, or by grounding as shown diagrammatically in Fig. 10. The contact element 403 is connected, through the conductor 408, with one terminal of the ignition circuit of the engine, the contact 404 being connected to the other terminal. The spring 402 carried upon the shaft 400 tends to normally urge the contact element 403 into contact with the contact element 404. The contact element 403 comprises also an extension 410 having an upturned end 411 adapted to contact with the wheel at the extreme left of the counter mechanism which is so constructed as to normally hold the two contact elements out of contact with each other. Carried in the rim of the wheel with which this extension 411 cooperates is a slot 412. By means of this construction the elements 403 and 404 will be held out of contact until the various wheels of the counter have been actuated sufficiently to rotate the wheel at the extreme left to bring the slot 412 into such position that the upturned extension 411 may engage therein. When contact elements 403 and 404 are brought together the immediate result is a short-circuiting of the ignition circuit, as is clearly evident from the diagrammatic view in Fig. 10, with a consequent stopping of the engine. When this occurs the airplane will go into a dive and fall upon the objective below it at the time the ignition is cut off.

The blades of the fan 350 may be so arranged that any desired speed of rotation thereof may be secured. In actual practice the fan is generally designed to rotate once for each yard of travel, the worm 356 and gear 357 being adapted to close the contacts 360 and 362 once during each twenty rotations of the fan, that is, once each twenty yards. Upon closing of the contacts 360 and 362 there will be a flow of current through the electromagnet 367 thus energizing it to attract the armature and move the valve 368 to connect the tube 369 with the atmosphere. This will cause an unbalancing of pressures upon opposite sides of the diaphragm 377 to cause lifting of the valve 375 and to connect the interior of the bellows 379 with the equalizer 120. As a result the bellows will collapse and there will be an upward movement of the movable member 382, which will in turn cause a swinging of the stirrup 393 and actuation of so many of the toothed members 389 as happen to be in contact with the fingers 396 at that particular moment. The speed of rotation of the fan 350 is of course dependent upon the relative speeds of the airplane and the air. That is to say the speed of rotation of the fan is not necessarily truly indicative of the rate of travel of the airplane. Rather is it the resultant of the rate of movement of the airplane plus or minus the wind velocity at the time. Knowing the speed of the airplane, and knowing the wind velocity and the direction thereof at the time the airplane is to be in the air, it is a comparatively simple matter to determine the number of revolutions that the fan will make during travel over any predetermined distance. By way of illustration:—Presuming that the airplane is adapted to travel under its own power, in still air, at a rate of 100 miles an hour, and presuming that the plane is called upon to fly against a head wind having a velocity of 20 miles an hour, it is obvious that the actual distance covered by the plane per hour will be 80 miles. The fan, however, will rotate at the rate of speed which corresponds to an air velocity of 100 miles an hour. Presuming again that it is desired to have the plane fall upon an objective 50 miles away from its point of launching, by proper setting of the counting mechanism the wheel at the extreme left may be caused to bring the slot 412 therein beneath the extension 411 after the plane has actually traveled 50 miles. As stated above the counter may be operated either as an addition counter or a subtraction counter. In actual practice the subtraction counter has been found more desirable. With such a counter it is merely necessary to set the various wheels of the counter to represent the distance which it is desired that the plane travel. As the plane travels through the air thereafter each rotation of the gear 357 will cause actuation of the counter to subtract from that said distance, until the total distance has been subtracted whereupon the ignition will be short-circuited, the engine stopped, and the plane thrown into a dive to fall upon the objective.

In Fig. 34 is shown, somewhat diagrammatically, the fuel feeding mechanism for the engine, and the apparatus associated with the engine whereby the operating vacuum for the pneumatic system is secured. This figure shows the crank case of the engine, with the various cylinders thereof broken away in order to more clearly show the arrangement of the various parts having to do with the carburetion system and the pneumatic system.

As described above the engine 108 is preferably a two-cycle four-cylinder engine, and in such engine the crank case is divided into a number of substantially air-tight compartments, one for each cylinder. These compartments are numbered respectively 420, 421, 422 and 423, the compartments being shown in general outline by means of dotted lines. Located adjacent the crank case of the engine and connected to the equalizer 120 is a tube 116. Leading off from this tube are three branch pipes 424, 425 and 426, which open respectively into the compartments 420, 421 and 422, through the base of the cylinder cooperating therewith. Located in each of the pipes 424, 425 and 426 is a check valve 114. Each of these check valves, as is shown in detail in Fig. 35, comprises a body portion 428 having an extension 429 thereon externally threaded and adapted for insertion in said pipes. Also carried by the body member is a seat 430. Threaded upon the body member is a cap member 431, having an extension 432 also externally threaded and adapted for insertion in each of the said pipe members. Cooperating with the seat 430 is a disc valve 433 retained in place by means of a cage 434, having a stop 435 thereon to limit opening movement of the valve disc. A check valve of this type is inserted in each of these pipes 424, 425 and 426, such valve being arranged to permit ready flow from the equalizer through the pipe 116 and branch pipes 424, 425 and 426 into the compartments 420, 421 and 422 upon upward movement of the pistons, but to prevent back flow through these pipes into the equalizer upon downward movement of the pistons. By means of this construction the engine is caused to function as a suction pump whereby a partial vacuum is maintained in the equalizer and the pneumatic system. As explained above the equalizer acts somewhat as a vacuum reservoir and is adapted to eliminate fluctuations that would be present in a pneumatic system were it connected directly to the compartments of the crank case. Instead of a two-cycle engine some other type of prime mover may be used if desired. Such prime mover, however, should be adapted to itself function to provide the suction necessary for operating the pneumatic controls or it should be operatively connected to some mechanism capable of so functioning.

For feeding fuel to the engine a pressure system is used. Connecting the interior of the fuel tank 437 with the compartment 423, associated with the cylinder of the engine not connected to the equalizer, is a pipe 438 having a check valve 439 therein. This check valve is identical in construction with the check valve 114, details of which are shown in Fig. 35. The valve 439, however, is so positioned that flow from the compartment 423 to the interior of the fuel tank is permitted upon the down stroke of the piston associated with the compartment 423 and back flow from the fuel tank into the compartment upon up stroke of the piston is prevented.

In order to obviate the troubes arising from the use of a conventional carburetor, in airplane work and in connection with a two-cycle motor, novel means is provided for supplying the fuel to the engine. In this fuel supplying mechanism the float chamber of the carburetor is entirely dispensed with and a pressure regulating valve 440 is substituted therefor. (See Fig. 36.) This valve consists of a pressure operated diaphragm valve comprising a casing consisting of a bottom portion 441 and a top portion 442 tightly fastened together, in any desired manner, with the diaphragm 443 between them. This diaphragm may be of any desirable material which is not subject to deterioration when in contact with gasoline, or other motor fuel. Tightly connected to the bottom 441, at substantially the center thereof, is a sleeve 444 having its outer end externally threaded and adapted for connection to a pipe leading into the fuel tank 437 and extending to approximately the bottom of such tank as is the usual arrangement in pressure feed systems. The sleeve 444 is internally threaded and has screwed therein a member 445 which carries the valve seat 446, the member 445 being held in adjusted position by means of the member 447. Positioned within a passage through the sleeve 445, and adapted to cooperate with the seat 446 is a valve 448 so positioned that its closing movement is in the direction of flow of fuel therethrough. The valve is normally urged towards its seat by means of spring 449, adjustment of which may be secured by means of the threaded member 450. Extending upwardly from the valve seat member is a guide 451 through which passes the extension 452 carried by the valve. The upper end of this extension is adapted to contact with the diaphragm 443. Extending upwardly from the top 442 is a hollow standard 453 having a spring pressed member 454 normally in contact with the diaphragm and tending to urge it to hold the valve off its seat. The spring 455 which cooperates with the member 454 bears at its outer end against the member 456 which is threaded within the passage running through the standard 453. By screwing the member 456 in or out the tension of the spring 455 may be increased or decreased to vary the operation of the valve. Opening out of the lower member 441 is an internally threaded nipple 457 adapted to receive the fuel feed line 458. During operation of the engine, the fuel under pressure within the tank 437 is forced upwardly through the valve into the lower part of the diaphragm chamber 441 and thence through the nipple 457 and fuel feed line 458 to the engine. It is desirable to so adjust the springs 449 and 455 that the pressure within the fuel feed line 458 will be maintained at a definite predetermined pressure, in the engine illustrated this pressure being substantially two pounds per square inch. If the valve, and the cooperating springs, are so set that with a desired opening a pressure of two pounds per square inch is attained within the lower part of the diaphragm casing 441, any tendency to vary this, either above or below two pounds per square inch, as a result of increased or decreased pressure within the fuel tank, will immediately result in an opening or closing movement of the valve to give such an effective opening as will insure the desired pressure upon the diaphragm 443.

The fuel feed pipe 458 leads into a venturi 460, a needle valve 459 of any desired or conventional structure being inserted in the fuel feed line to regulate the flow of fuel to the venturi, a suitable type of needle valve being shown, in dotted lines, in Fig. 37. The venturi and needle valve construction is substantially the same as that normally used in carburetors such as are widely used in automobile or airplane engines. The pressure regulating valve feeds the fuel up to the needle valve at a constant head. This type of fuel feed is especially desirable for use with two-cycle engines for the fuel is fed into the venturi under a positive pressure and the suction within the crank case is not utilized for lifting the fuel through the needle valve.

The venturi 460 opens into a fuel feeding manifold 461 from which the fuel passes into the crank case compartments 420, 421, 422 and 423 through passages 462, 463, 464 and 465. The fuel feed line 458 has a cut-off valve of any desired construction, such for instance as the conventional turning plug 466 is inserted therein for cutting off the flow of fuel therethrough when the engine is not operating. Inasmuch as there is no carburetor float chamber in the fuel system, but the flow of fuel is dependent upon the pressure maintained within the fuel tank, it is necessary to insert a positive cut-off valve in the fuel feed line so that the fuel may be prevented from flowing from the tank when the engine is not in operation. In the absence of such a cut-off valve it would continue to flow so long as sufficient pressure existed within the fuel tank to force it through the feed line.

In Fig. 37 is shown a sectional detail view through the venturi along the line 37—37 of Fig. 34. As shown the fuel feed line 458 is controlled by the needle valve 459, the fuel passing through such needle valve and into the venturi through the opening 467. This construction is quite similar to that found in the conventional carburetor, the fuel mixture passing from the venturi into the manifold 461 whence it passes into each cylinder compartment through the inlet passage cooperating therewith, the passage shown in Fig. 37 being that designated 465 in Fig. 34.

In operating a device such as that described above, the airplane equipped with the control mechanism described is placed upon the launching car and arranged thereon in the position that it will occupy during flight. That is to say the plane is so arranged upon the launching car that it points in the desired direction of flight, and is inclined at substantially the angle at which it is desired that it climb. Having been placed in this position the gyroscope is adjusted so that its rotational axis is parallel with the line of flight. At the same time the gyroscope casing is positioned about its horizontal axis so that the valve 195 is arranged in substantially neutral position as regards the open ends of the tube 186, that is to say the gyroscope casing and the valve 195 carried thereby are so positioned that the operating pressures upon opposite sides of the balanced pneumatic 295 cooperating with the tube 186 are equal. Having thus adjusted the gyroscope, the sleeve 235, with its eccentrically arranged locking element 237, is turned to bring the element 237 into such position as to permit of locking the gyroscope to hold it in its adjusted position. The locking member 237 is then forced into locking relation with the cooperating end 240 and the key 242 is placed in the groove 241 to lock the gyroscope in adjusted position. Having once locked the gyroscope in this position the airplane may then be rearranged upon the launching car in normal launching position. After being placed in this position it is attached to the launching car by means of the wire 133.

The engine is then started and the gyroscope rotor brought up to speed. After the gyroscope rotor has been brought up to speed, the key 242 may be removed, the launching car released and under the propelling action of the engine, and propeller driven thereby, the car and airplane will travel down the track until a speed has been attained giving it sufficient lifting power to break the wire when it will leave the car under its own power.

Theoretically the gyroscope, having once been adjusted about its horizontal and its vertical axes should maintain its adjusted position. In gyroscopes as ordinarily constructed, however, this theoretical perfection is not secured, such gyroscopes being usually accurate about only one axis. And in order to gain extreme accuracy about one axis it has been heretofore found that extreme accuracy about the other axis must be sacrificed. Of course it is well known that when the rotor element of the gyroscope has been set in sufficiently rapid rotation it will resist any forces tending to change its position about either its horizontal or its vertical axis. And, as is well known, a force tending to cause rotation of the gyroscope about its vertical axis will cause a rotation of the gyroscope about its horizontal axis, if the gyroscope is free to rotate about such horizontal axis. And the reverse is also true, that if a force is applied to a gyroscope tending to rotate that gyroscope about its horizontal axis, the gyroscope will, as a result of such force, rotate around its vertical axis, if free to thus rotate. Inasmuch as the more important function of the gyroscope in the control apparatus described is to control the direction of flight, and accurate control of the direction of flight necessitates that there be the least possible orientation of the gyroscope, that is rotation of the gyroscope about its vertical axis, the pivots constituting the horizontal axis about which the gyroscope is adapted to turn are made as nearly as possible frictionless. An ideal frictionless bearing or pivot being one in which one element of the bearing is a point, the pivots constituting the bearing elements for the horizontal axis of the gyroscope, as illustrated, are made of hardened steel and have the bearing ends thereof made as nearly a perfect point as practically possible. Consequently in the swinging of the gyroscope about its horizontal axis there is practically no frictional effect and so practically no force exerted tending to cause orientation or movement about the vertical axis.

As stated above, gaining extreme accuracy about one axis generally entails a decreased accuracy about the other axis. And the drawing, particularly Fig. 21, shows that there is no such minimizing of friction about the vertical axis as there is in the horizontal axis. As a consequence rotation of the gyroscope frame 180 and the gyroscope gimbal ring 181 relative to each other produces slight frictional forces within these bearings. In actual flight the frame 180 is fastened to the vehicle and any deviation of that vehicle from the true directional line of flight will result in rotation of the frame about the vertical bearings connecting the frame to the gimbal ring, it being of course recognized that the gyroscope will tend to remain in its adjusted position. The slight amount of friction resulting from this relative movement caused by the frame turning about the vertical axis of the gimbal ring is sufficient to cause precession of the gyroscope, that is rotation about its horizontal axis.

Rotation of the gyroscope about its horizontal axis in either direction, for an appreciable distance, would move the valve 195 into such relative position as to cause it to no longer function in the desired manner with respect to the tube 186. That is to say a substantial precession of the gyroscope would cause the valve 195 to either completely cover or completely uncover the open end of the tube 186. This would of course destroy the usefulness of the apparatus adapted to control the angle of flight of the plane. For example, if precession should cause complete closing of the tube 186 the elevator would be operated to increase the angle of climb to throw the ship into a stall, and precession in the opposite direction would of course have the opposite effect. In order to secure accuracy of the apparatus controlling the angle of flight of the airplane, the gyroscope is caused to itself compensate for undesirable precession to bring the valve 195 and the open end of tube 186 back to substantially the predetermined relative position. This desirable compensating effect is secured by proper adjustment of the gyroscope described above.

For securing this desired adjustment of the gyroscope, use is made of the weights 214 and the weights 246. By proper manipulation of these weights the gyroscope casing, and the rotor element therein, may be so balanced about the horizontal axis of the gyroscope that there is no tendency for this casing and rotor element to rotate about the horizontal axis. That is to say the casing and rotor element of the gyroscope should be so adjusted that the mass of these parts is distributed in such wise as to bring the center of gravity thereof within the horizontal axis of the gyroscope. If the center of gravity of the gyroscope is not thus located in the horizontal axis, the downward pull of gravity upon the unbalanced masses of the gyroscope casing and associated parts will give rise to moments of force sufficient to cause orientation of the gyroscope about its vertical axis. This would of course seriously interfere with directional control.

With such adjustment of the gyroscope casing and associated parts it is evident that if precession takes place there is no means for rectifying the undesirable condition that results, the effects of which undesirable conditions are set out above. And precession will result, almost inevitably, in actual practice, as a result of forces due to friction in the vertical bearings, to currents of air and to many other possible causes. To compensate for such precession when it does occur, and to bring the gyroscope back into such position that the valve 195 and open end of the tube 186 are in substantially the desired relative positions, the gyroscope casing and rotor elements associated therewith are purposely adjusted so that if recession does occur, a rotational force tending to turn the gyroscope about its vertical axis will be set up, such force being so directed as to cause return precession of the gyroscope to bring it back to substantially the desired predetermined setting. To secure this desired condition the gyroscope, after being properly balanced about its horizontal axis, is shifted bodily along that axis by proper adjustment of the bearings 190, so as to place a preponderating mass or weight of the gyroscope casing, rotor, gimbal ring and associated elements to one side of the vertical axis. After the gyroscope is properly balanced such shifting of the gyroscope casing along its horizontal axis, for any desired distance, in nowise effects its balance around that horizontal axis. So long as the gyroscope remains in normal position, therefore, the unbalanced weight of the gyroscope, due to its being adjusted with a greater weight at one side of the vertical axis than at the other, has no rotational effect on the gyroscope about either its horizontal or its vertical axis, the only rotational effect, when the gyroscope is in this normal position, being one adapted to cause rotation of the rotor element about its rotational axis. And such rotational effect is not adapted to effect either precession or orientation. Suppose, however, the direction of flight of the airplane varies. This will cause relative rotation of the frame and the gyroscope about the vertical bearings. And as set out above, friction during such relative rotation is sufficient to cause a precessional moment of force. Consequently precession will occur. As soon as precession occurs, however, the angle of flight of the airplane will be altered with corresponding movement of the vertical axis of the gyroscope, and as a result the unbalanced weight of the off-set gyroscope casing and associated elements will be subjected to the downward pull of gravity which will give rise to a moment tending to rotate the gyroscope about its vertical axis, which moment will itself cause precessional movement of the gyroscope. The offsetting of the gyroscope is prearranged to give a compensating precessional movement, resulting from the downward pull of gravity, which is opposite in direction to that precession resulting from friction in the vertical bearings, to thus tend to return the gyroscope to substantially its original positioning.

The gyroscope when properly balanced tends to point in a fixed direction in space. While thus holding a fixed direction in space, the earth tends to revolve under the gyroscope. Therefore, at any place on the earth's surface between the Equator and either pole, the gyroscope will not hold a fixed direction both as regards space and the earth's surface. That is, if the gyroscope is set to point at a definite place on the earth's surface it will not continue to point at that place because of the rotation of the earth. This apparent deviation of the gyroscope will of course vary with the latitude at which it is being used. In an automatically controlled vehicle it is necessary to compensate for the apparent deviation of the gyroscope. This is done either by so unbalancing the gyroscope that forces will be set up causing orientation about the directional or vertical axis at a rate equal to the rate of movement of the objective due to the earth's rotation, or it is placed in absolute balance and is set to point toward the place that will be later occupied by the objective. That is, the gyroscope is so unbalanced that it appears to hold a constant direction with respect to a point on the earth's surface, or is so balanced that it holds a true direction in space and is set to point at the place the objective will occupy after a definite period of rotation of the earth. The rate of precession necessary for securing this desired path of travel varies at different latitudes on the earth's surface, and it is, therefore, necessary to determine the rate of orientation needed and balance, or rather unbalance, the gyroscope to give this predetermined rate. The balancing or unbalancing of the gyroscope must, therefore, be worked out separately for each separate set of conditions.

In Fig. 5 is shown a wiring diagram of the electrical system forming a part of this control apparatus. As shown in that figure the numeral 110 designates generally the direct current and alternating current generator, the direct current side of this generator being connected to the shunt field 500, and the alternating side being designated by the numeral 501. As stated above, no detailed description of this generator is given, details of construction being clearly shown in the copending application of C. F. Kettering, W. A. Chryst and John H. Hunt, Serial No. 343,334, filed December 8th, 1919, and any generator adapted to furnish both direct and alternating current being capable of substitution therefor. In fact separate generators for direct current and for alternating current may be used if desired, but economy of space, weight etc. makes a generator of the type referred to especially desirable. In the control apparatus herein described the generator was adapted to supply a 12 volt direct current and a 50 volt high frequency alternating current, but of course other voltages may be used if desired, it being only necessary that the generator and control mechanisms be so designed relative to each other that these mechanisms will function satisfactorily on the current provided. The alternating current generated is three phase, the windings for producing such three phase current being shown generally at 501. This alternating current, in the control disclosed herein, is used solely for driving the gyroscope rotor, the gyroscope and the rotor winding being shown diagrammatically at 502. In order to provide three phase alternating current by means of a generator such as is disclosed, three poles are provided, both on the generator and on the gyroscope windings, each pole of the generator being connected to a corresponding pole of the gyroscope coils. For purposes of adjustment, and in order to bring the gyroscope up to speed, without the necessity of running the airplane engine, the electrical system is provided with auxiliary connecting plugs, shown diagrammatically at 503, 504 and 505, these plugs being included in the alternating current circuit. These plugs are of the spring type in which the contacts are normally held closed to connect the gyroscope with the generator 110. When testing by the use of outside current, or when bringing the gyroscope up to speed, as before launching a plane, the contacts are separated so as to break connection with the generator, the contacts under such circumstances contacting with contact elements on the plugs whereby this part of the electrical system is connected with the outside source of current. The alternating current system comprises the conductors 508, 509 and 510, two of these conductors being connected to the terminals 512 and 513, carried upon the gyroscope frame and, through the conductors 515 and 516 to two of the coils upon the stator element of the gyroscope. The third conductor is connected to terminal $218^b$ which is connected to the third coil of the stator element of the gyroscope. This terminal is grounded to the frame, and the frame in turn is electrically connected to the gyroscope casing by means of the member 223 and the spring conductor 224. The third coil upon the stator element of the gyroscope is also connected to the gyroscope casing by means of the conductor 225. In this manner the third pole of the alternating current side of the generator is connected to the third coil upon the stator element of the gyroscope. The construction of the gyroscope described is such that the rotor element normally maintains a speed of 11,000 or 12,000 revolutions per minute, the design of the generator being worked out to supply sufficient alternating current to maintain the gyroscope at this speed. Of course other speeds of rotation of the rotor may be used if desired.

The direct current side of the generator is used to furnish current for engine ignition and for operating two electrically operated valves 368 and 302, one in the distance control and the other in the altitude control. As stated above the ignition system comprises any desired type of distributor and timer. The specific type of timer and distributor used in the apparatus described above is shown in detail in the above referred to copending application Serial No. 343,334, filed December 8, 1919. Any conventional ignition mechanism adapted for a four-cylinder two-cycle engine will function satisfactorily in this ignition circuit, such a distributor and timer as the conventional "Delco" distributor and timer with the timer adapted to produce sparking impulses at each cylinder upon every revolution, being capable of functioning very satisfactorily. The elements of the ignition system, as shown diagrammatically in Fig. 5, comprise the timer 517, the distributor 518 and the ignition coil 519. The ignition circuit comprises the conductors 520 connecting one pole of the direct current side of the generator to one terminal of the timer, through the spring plug 507, the conductor 521 connecting the timer to the low-tension side of the ignition coil, and the conductor 522 connecting the low-tension coil to the other pole of the direct current side of the generator through the spring plug 506. The ignition circuit also includes a conductor 523 connecting the high-tension winding to the distributor and the conductor 524 connecting the other terminal of the high-tension winding to a ground.

As stated above the electrically operated valve included in the distance control, the "air-log valve", and the electrically operated valve included in the altitude control, the "altimeter valve", are each operated by direct current from the direct current side of the generator. Included in the same circuit as the air-log valve are the "counter contacts" 404 which during flight are normally open, but after a predetermined distance has been traversed are caused to close and thus short-circuit the ignition circuit to stop the engine. The counter contacts are included in a circuit comprising the conductor 521 which is connected to the conductor 522 of the ignition circuit and the conductor 525 which is connected to the conductor 520 of the ignition circuit. Operation of the air-log valve, as described above, results from closing of the contacts 362, in the air-log 350 (Fig. 15) with the resulting flow of current through the electromagnet to energize that magnet and to thus cause functioning of the valve. The circuit connecting this valve to the direct current side of the generator includes the conductor 526, which is connected to the conductor 525, and the conductor 527 which is in turn connected to the conductor 522. The altimeter valve is similar in structure to the air-log valve the only difference being the use of the sleeve 336, described above, and is operated upon closing of the contacts 318 and 319, such contacts being designated, in this figure, "altimeter contacts". The circuit including the altimeter valve comprises the conductor 528 which is attached to the conductor 522 through the conductor 527 and the conductor 529, which is attached to the conductor 520 through the conductor 525.

In Figs. 38 through 43 is shown control mechanism adapted for use where ailerons, instead of the pronounced dihedral angle disclosed particularly in Fig. 3, are utilized for maintaining the airplane in lateral equilibrium. The conventional method of maintaining an airplane in lateral stability is to use ailerons. This means of maintaining lateral stability is so well known that no description thereof is thought necessary in this application. In the conventional aileron construction the ailerons are of course operated by the airplane pilot who shifts them as the necessity arises. In the apparatus disclosed herewith mechanism is shown adapted for automatically shifting the ailerons to maintain the airplane in the desired lateral stability.

This aileron control mechanism is shown somewhat diagrammatically in Fig. 38 and comprises a plurality of ailerons, 550. Only one of these ailerons is shown, but in a complete plane it would be necessary to incorporate at least two ailerons, one upon each set of wings. Inasmuch as the ailerons are identical in construction and are operated in the same manner, and by the same mechanism, it is not thought necessary to illustrate more than the one aileron which is shown conventionally or diagrammatically. The aileron 550 is mounted in a pocket in the outer end of the wing 103ª, such aileron being carried upon a shaft 551, which has rigidly mounted thereon a bell-crank lever 552. Attached to the opposite ends of the bell-crank lever are two control cords 553 and 554. Any pull exerted upon the cord 553 will tend to swing the shaft 551 and the aileron carried thereby in one direction, whereas pull upon the cord 554 will tend to swing the aileron in the other direction. The construction shown is intended to merely illustrate diagrammatically the fact that the aileron is connected to the control mechanism in such manner that a positive moving force may be impressed upon it to swing it in either direction, and no endeavor is made to illustrate the precise arrangement of the cords, 553 and 554, with respect to the ailerons, as such arrangement would be dictated by the precise structure and arrangement of the airplane upon which this control is to be used. The cords 553 and 554 are connected each to one end of the movable element of the double bellows 555, shown in phantom in Fig. 38 and the associated figures, which is rigidly attached to a block 556, the block in turn being rigidly mounted upon the control board 126ª. Associated with the double bellows 555 is a pendulum operated valve mechanism, indicated generally by the numeral 557, adapted upon movement of the airplane about its longitudinal axis to cause the bellows 555 to function to thus operate the ailerons 550 and bring the airplane back to a level keel.

This pendulum control valve mechanism comprises a standard 560 which is rigidly secured to the instrument board 126ª. Carried by the upper end of the standard 560 and the cooperating free end of the overhanging extension 561 is a plurality of pivot members 562 adapted to support the rotatable shaft 563 therebetween. This shaft 563 and the associated pivots 562 together constitute the main pivot of the pendulum mechanism. Carried upon the shaft 563 is a plate 565, which as shown in detail in Fig. 43, has a passage 566 therethrough, adapted to receive the shaft 563. Passing through the plate 565 is a plurality of passages 567, 568 and 569. The passages 567 and 568 have attached thereto the pipes 570 and 571, by means of which these passages are connected respectively to opposite ends of the bellows 555. The passage 569 is connected to a pipe 572 which is in turn connected to an equalizer such as that described above. Mounted upon the face of the plate member 565 and adapted to cooperate with the passages 567, 568 and 569 is a ported valve plate 575. This plate carries ports 576, 577 and 578 which are adapted to register with the passages 567, 568 and 569. The plate 575 also has four holes 579 therein adapted to register with corresponding holes 580 in the plate 565 whereby the two are held in assembled position, as by means of screws 581. It is not essential that the plate 575 be used, its primary purpose being to give a ready means of properly proportioning the effective opening through the passages 567, 568 and 569. And the passages 567, 568 and 569 may be so constructed in the plate 565 that the desired effective opening thereof is secured without the use of the plate 575, in which case this latter plate may be entirely dispensed with. Carried upon the face of the plate 565 is a substantially U-shaped extension 585 having a threaded passage 586 therein adapted to receive a pivot member 587 which is in alignment with a pivot member 588 carried by the plate itself. Each of these pivot members is threadedly mounted so that it may be adjusted as desired. And the same construction characterizes the pivot members 562. Mounted between the pivot members 587 and 588 is a shaft 589 which constitutes a pendulum support or pivot. Suspended from the pivot shaft 589 is a pendulum 590, the upper end of which has a passage 592 therethrough adapted to receive the member 589. Carried by the pendulum is a lateral extension 591, which constitutes the valve member of the control mechanism, a recess or port 593 being provided therein adapted to cooperate with the ports 576, 577 and 578. As shown the recess 593 is so shaped that it constitutes in effect a D-valve. The ports 576, 577, 578 and 593 are shown in dotted lines in Fig. 39, and also in Figs. 41 and 42. As is clearly shown in the drawing, when the pendulum 590 is in normal or neutral position the port 593 is so positioned that neither of the ports 576—577 is in register with the port 578. As soon, however, as the pendulum moves out of neutral position, as it would do upon movement of the airplane about its longitudinal axis to swing the pendulum about the pivot member 589, the port 593 will be moved relative to the ports 576—577 to connect either one or the other of these ports to the port 578. This would connect one of the bellows members to vacuum and the other to the atmosphere to thus cause collapsing of one member and expansion of the other, with a consequent actuation of the ailerons to return the airplane to a level keel. With the ordinary pendulum movement, however, swinging of the pendulum to one side or the other necessarily entails a return movement of the pendulum carrying it past dead center on a swing to the other side. The result of such swinging movement would be to connect first one and then the other of the ports 576 and 577 to the source of suction.

To overcome this defect the oscillatory or swinging movement of the pendulum is damped so that the return swing of the pendulum, with its attendant evils, is prevented. To secure this damping of the oscillatory motion the pendulum mechanism is so arranged that when the pendulum tends to swing about its pivot 589, as a result of movement of the airplane about its longitudinal axis, the pendulum pivot 589 will also be caused to move in the same direction in which the pendulum tends to swing. Return swing of the pendulum will thus be prevented.

For securing this swinging of the pendulum pivot the lower end of the plate 565 has attached thereto a plate 595 carrying a bifurcated extension 596. Mounted upon the movable member 597 of the bellows 555 is a plate carrying a bifurcated up-standing extension 598. Adjustably mounted in the bifurcated extension 598 is an extension or stud 599, which is of such length that its free end, when the device is in assembled position, moves within the space in the bifurcated extension 596.

As the airplane rolls about its longitudinal axis it will cause swinging of the pivot 563 to one side or the other of the vertical, and at the same time will cause a swinging of the pendulum 590 about its pivot 589. This will connect one of the ports 576—577 to port 578 to cause a consequent collapsing of one of the bellows and expansion of the other with an ensuing movement of the movable member 577 of the bellows to bring about actuation of the ailerons. As soon as the member 597 tends to move, however, upon collapsing of the bellows, the extension 598, and the stud 599 carried thereby, will also tend to move in the same direction as the pivot member 563. This will, through the extension 596, cause a swinging of the plate 565 about the pivot 563 and, since the pivot 589 of the pendulum, is carried by the plate 565 it will cause an actual bodily movement of the pivot 589 in the same direction as the pendulum tends to swing. Consequently return swing of the pendulum will be substantially damped out inasmuch as at the finish of the swing the pivot 589 will lie substantially in the vertical axis of the pendulum.

Fig. 41 shows an intermediate stage in the operation of this control mechanism. As shown in that figure the instrument board 126$^a$, which is attached to the body of the airplane, and of course moves in accordance with the movement of the airplane, is in a position showing that the airplane has been rolled to the left of the vertical. This figure shows the mechanism after the pendulum has begun its first swing to move the port 593 to connect the port 576 with the port 578, but before the corresponding end of the bellows has itself begun to collapse. Fig. 42 shows the completion of the movement which is shown in an intermediate stage in Fig. 41. As shown in Fig. 42 the bellows has collapsed and the pendulum pivot has been also swung to the left so that when the pendulum reaches the end of its swing, the position in which an ordinary pendulum would begin its return swing, the pivot is so moved as to lie substantially in the vertical axis of the pendulum so that there is little or no tendency for the pendulum to make a return swing. As shown in Fig. 42 the port 593 again has assumed neutral position with respect to the ports 576, 577 and 578.

Inasmuch as the stud 599 is made adjustable the swing of the pivot 589 as a result of functioning of the bellows 555 may be varied so that the return swing of the pendulum may be completely damped out or, if desired, only partially damped. Of course rotation of the airplane to the other side of the vertical than that illustrated in Figs. 41 and 42 will cause a swinging of the pendulum to that same side, and a corresponding actuation of the bellows tending to swing the pendulum pivot in the same direction to thus damp oscillation of the pendulum.

In Fig. 44 is shown a modified form of directional control mechanism comprising a compass instead of a gyroscope as described above. This figure shows this modified form of directional control somewhat diagrammatically, the main operating bellows 149$^a$ being operatively connected to control means 146$^a$ in the same manner as described above. The bellows 149$^a$ is connected to the main valve box 170$^a$ by means of two tubes 154$^a$ and 155$^a$. The valve box 170$^a$ contains two valves 273$^a$ and 274$^a$. These valves are identical in structure with the corresponding valves shown in Figs. 22, 23 24 and 25, and are connected to the source of vacuum through the pipe 174$^a$. This main valve box 170$^a$ is connected to the direction controlling mechanism by means of the tube 342$^a$, which, adjacent the main valve box, is divided into two branches leading into the chambers beneath the valve operating diaphragms as is the case with the passages 270 and 272 of the main valve box 170 described above. This part of the apparatus is substantially similar in structure to the corresponding parts of the directional control mechanism described above. The valves 273$^a$ and 274$^a$ are adapted to move in the same direction, and at the same time, and are adapted to connect one side of the bellows 149$^a$ to suction and the other to the atmosphere, but not to connect both sides to suction or to the atmosphere at the same time. Operation of these valves is secured by varying the leakage of air through the tube 342$^a$ into the chambers beneath the operating diaphragms for the valves. Instead of controlling the leakage into this space beneath the operating diaphragms by means of a gyroscope, however use is made of a compass mechanism. As shown this compass mechanism comprises a closed chamber 600, having a cover 601 carried thereby. Mounted upon the under side of the cover is a spider 602 carrying a bearing 603, which acts as the lower bearing for the shaft 604 upon which is mounted a plurality of compass needles 605. These compass needles are enclosed within a float 606, the chamber 600 having a liquid 607 therein adapted to buoy the float, and the compass mechanism thereby, to decrease friction within the compass needle bearings. Also carried by the spider 602 is a cross beam 608 carrying a pivot member 609, arranged in alignment with the bearing 603. On the upper side of the float 606 is a second spider 610 carrying a bearing member 611. By means of this construction it is seen that the float, and the compass needles are rotatably mounted between the bearings 603 and 611. Adjustment of the bearings to compensate for wear, or for other causes, is secured by adjusting the threaded bearing 603. By means of this construction not only may the float and other compass mechanism be sustained in proper position between the bearings, but, because of the sustaining liquid within the chamber 600, the float and associated mechanism is suspended in such wise between these bearings that there is very little friction thereat. If other means is used for rendering the bearings sufficiently free from friction this buoying liquid may, of course, be dispensed with. Carried upon the upper side of the float is a bar magnet 612 so arranged that its poles correspond to the poles of the needles 605, this magnet in fact constituting merely a large and powerful compass needle. On the upper side of the top 601 are two extensions 613 to which are attached a cross-bar 614. Threaded through the cross-bar 614 is a tube 615 adapted to receive one end of the tube 342$^a$. The free end of the tube extends through the bar 614 and constitutes just such a leak port as is shown and described above, for instance in connection with the tube 232 shown in connection with the gyroscope in Fig. 20. Also mounted upon the upper side of the top 601 and substantially in alignment with the bearing 603 and 611 is a bearing member 618 which is arranged in alignment with the adjustable bearing member 616 carried by the bar 614. Mounted between these bearings is a valve member 617, having a part thereof so positioned that upon rotation it will swing past the open end of the tube 615 without coming in frictional contact therewith and having the free ends thereof positioned closely adjacent the cover 601, without coming in actual frictional contact therewith upon relative movement. The valve 617 is made of some magnetically influenced material, such as steel, and when the device is in assembled position, this valve will tend to assume a position in which its free ends are in closest adjusted position to the free ends of the bar magnet 612.

Deflection of the ship from the true line of flight will result in a rotation of the chamber 600 and the parts carried thereby around the compass needles, which will tend to remain motionless and point in the direction of the magnetic pole. Upon such rotation of the chamber 600 the valve 617 will tend to follow the poles of the magnet 612 and will thus move relative to the ports, carried by the chamber 600. That is, as the chamber 600 moves, following the movement of the airplane, it will carry the tube 615 therewith. Inasmuch as the valve 617 will tend to remain stationary under the influence of the magnet 612, the free end of the tube 615 will tend to swing over this valve to thus vary the effective opening therethrough. This will, of course, cause actuation of the main operating bellows 149ª, as described above.

In Fig. 45 is shown still another modified form of directional control mechanism. In this modified form the main operating valve 170ª is dispensed with and in lieu thereof two valves 620 are provided for controlling leakage of air into the suction line 621 to thus control functioning of the operating bellows 149ª. These valves 620 are carried upon a pivot arm 622 the opposite ends of which are attached respectively to two minor operating bellows 623, by means of the connecting members 626, each of which bellows is attached, by means of the pipe 624, to the main source of suction or vacuum. Leading into each of the bellows 623 is a tube 625, through which there may be a leakage of air. Attached to each of the tubes 625 is a threaded tube 615ª identical in construction with the tube 615 described in connection with Fig. 44. These tubes 615ª are mounted on a bar 614ª which is carried by a compass mechanism similar to that shown in Fig. 44. That is to say, the compass mechanism associated with the main operating bellows 149ª in Fig. 45 is identical in structure with the compass mechanism shown in Fig. 44, excepting that two tubes 615ª are used instead of one tube 615. The operation of this modified form of apparatus is thought quite clear. As the ship tends to swing to one side or the other of the line of flight, the tubes 615ª are caused to move relative to, or swing across, the valve member 617ª, and so the effective opening into each of the tubes is varied, the effective opening through one tube being increased and that through the other tube being decreased. As these effective openings thus become unbalanced, one of the bellows 623 will be caused to expand and the other to collapse, which will in turn, cause swinging of the arm 622 about its pivot 627 to move one valve 620 to decrease the effective opening into the tube 621 and the other valve to increase the effective opening into the tube 621. This will in turn cause actuation of the bellows 149ª to swing the rudder to return the ship to the desired direction of flight. In both the forms of compass control mechanism described, and also in the gyroscope directional control mechanism shown above, the mechanism adapted to vary the effective opening through the bleed ports, by swinging the bleed ports and the controlling valve relative to each other, should be so arranged that substantially no frictional forces shall be set up. Otherwise the controls will not be sufficiently accurate.

In Figs. 46 and 47 is shown a modified form of mechanism for controlling the angle of flight of the airplane, and also the altitude of flight thereof. This form of mechanism comprises an altimeter designated generally by the numeral 650, which is mounted upon a control board 126ᵇ. The altimeter comprises a base member 651, to which is attached a hollow diaphragm, or expansible member, 652, which, as in the case of the altimeter described above, may have the pressure therein at atmospheric or either above or below atmospheric. Carried upon the base member is an up-standing member 653 to which is pivoted a lever 654. Mounted on the upper face of the diaphragm 652 is a threaded standard 655 upon which is carried a spool-shaped member 656, having a milled flange 657 upon the upper end thereof, adapted to cooperate with the locking finger 658, whereby the spool 656 may be adjusted upon the threaded standard 655 and locked in position thereon. One end of the lever 654 is adapted to be associated with the spool 656, such end being bifurcated or forked, as shown most clearly in Fig. 47. By means of this arrangement expansion or contraction of the diaphragm 652 will cause swinging of the lever 654 about its pivot point to cause movement of the free end 660, which free end constitutes in effect a valve member. Also mounted upon the instrument board 126<sup>b</sup> is the valve block 661 having two passages 662 therein, which are connected within the valve block, by means of the passages 663 with a recess 664 adapted to receive the free, or valve, end 660 of the lever 654. Each of the passages 662 is connected by means of a tube 665 to a minor operating bellows 667, carried upon a block member 668 which is in turn mounted upon the instrument board 126<sup>b</sup>. Each of the bellows 667 is so mounted that one face thereof is rigidly attached to the block 668 while the other face 669 is free to move. The free faces 669 are attached to each other by means of the yoke 670, so that movement of these free members must take place in unison. Leading into each of the minor operating bellows is a tube 671 which is connected to the source of suction or vacuum by means of the tube 672.

Mounted upon the shaft 675 which is pivoted between bearings 676 and carried upon any suitable part of the airplane where it will be subjected to the air stream, is a block 677 through which pass two tubes 678, which are connected to the main operating bellows by means of the tubes 679. Carried upon the block 677 is an extension 680 which is operatively connected, by means of the link 681 and arm 682 to the yoke 670 and thus to the movable members of the minor bellows 667. Pivoted upon the extension 683 of the block 677 is a valve carrying member 684, having upon its opposite ends valve members 685, so positioned as to cooperate with the open ends of the tubes 678. Also carried by the pivot member 684 is an extension 686, which is arranged, in the modification shown, at substantially right angles to the valve carrying member 684. This member 686 comprises a vane 687 adapted to position itself parallel with the air stream during flight of the airplane.

In setting this device preparatory to flight the spool 656 is adjusted so that when the plane is flying at the desired altitude the valve member 660 will be in neutral position as regards the open ends of the passages 663. If the valve 660 moves closer to the open end of the one tube 663 than to the open end of the other tube, the effective opening into such tubes will be decreased and the leakage of air through such tubes, and the tubes 665, into the minor operating bellows 667 will be unbalanced, so that one of these bellows will collapse and the other expand. Such functioning of the bellows 667, will cause the block 677 to swing about the pivot shaft 675, thus tending to vary the relationship existing between the open end of the tubes 678 and the cooperating valves 685. Such variation in the relative positioning of these valves and the open ends of the tubes will cause a variation in the effective opening to such tubes to cause actuation of the main operating bellows. The vane 687 is adapted to control the angle of flight of the airplane. Presuming that the bellows 667 are in neutral position, the operation of the elevator will be dependent upon movement of the member 687 to vary the effective opening through the tubes 678. That is to say, during flight the member 687 tends to assume a position parallel to the air stream, which air stream is substantially parallel to the angle of flight. If the angle of flight changes, there will be, therefore, a corresponding change in the position of the member 687 to vary the relative positioning of the valves 685 and the open ends of the tubes 678. This will cause actuation of the main operating bellows to move the elevator and bring the airplane back to the desired angle of flight. Any variation in the positioning of the valve 660 relative to the cooperating open ends of the passages 663, due to varying altitudes attained by the airplane, will cause movement of the member 677 to move the openings of the tubes 678 relative to the valves 685 to thus cause actuation of the elevator. That is to say, the position of the elevator, which controls both the angle of climb of the airplane, and also the altitude at which it moves, will be dependent upon the effective opening through the tubes 678. And this effective opening is in turn a resultant of the position which the member 677 assumes under the action of the altitude responsive member, and the position which the valves 685 assume under the influence of the member 687.

Particularly in a simple airplane, such as described above, there is considerable vibration, due to the engine, etc. It has been found that excessive vibration is detrimental to accurate functioning of the control mechanism. In order to obviate the troubles arising from such vibration it is necessary to mount the control board upon springs, such for example as are shown in Fig. 4. As shown in that figure the control board 126 has a spring member, designated generally by the numeral 700, arranged at each corner thereof and adapted for attachment to the body of the airplane. Each of the springs comprises a coiled portion 701 and a substantially straight portion 702, the coiled portion and the straight portion, both formed of a single integral piece, constituting in effect two springs. The portion 701, which is attached to the instrument board, constitutes a helical spring while the portion 702, which is adapted for attachment to the body of the airplane, constitutes what for convenience is termed a cantilever spring. By means of this construction the actions of the two parts of the spring seem to compensate for each other so that excessive vibration has comparatively little effect upon the instrument board. And the specific type of spring described is preferably used for mounting the instrument board where its use in connection with a small type of plane is illustrated, although other forms of springs might give just as satisfactory results.

As shown diagrammatically in Fig. 5 an automatically operated airplane of the type described is provided with certain auxiliary plugs or contact elements 503, 504, 505, 506 and 507. In an automatically operated airplane of the type described it is of course necessary at times to test the various control mechanisms and to adjust them. In order to facilitate such testing and adjusting, the auxiliary plugs are provided. By means of these plugs electrical current may be supplied to the gyroscope and to the various electrically operated valves without the necessity of running the airplane engine. A simple form of apparatus for supplying the current necessary for this purpose has been worked out, and for convenience is called a "nurse". This nurse, not shown, consists of a small warehouse truck having mounted thereon an internal-combustion engine for driving a pump to furnish a source of suction or vacuum to take the place of the suction or vacuum generated by the engine 108 during operation and a combined direct and alternating current generator such as that described above. The leads from the generator are adapted to plug into the auxiliary contacts 503, 504, 505, 506 and 507, and thus supply current to the various electrically operated devices. The suction creating device forming a part of the nurse is adapted for attachment to the tube 116ª shown in Fig. 4, as being carried by the equalizer 120. This tube, during operation, has associated therewith a small check valve adapted to permit the flow of air from the equalizer 120. The specific type of check valve is not disclosed inasmuch as any desired type of valve may be used, a very satisfactory type of valve being that described above. It has also been found that in controlling the flight of an airplane having controls, such as described herein, the air stream impinging upon the gyroscope will ofttimes set up forces thereupon sufficient to cause rotation of the gyroscope about one of its axes to thus render it inaccurate. In order to prevent this condition arising the instrument board has associated therewith a cover 705, which is hingedly connected thereto, as shown in Figs. 1 and 2 and may be thus swung into position to cover certain of the instruments upon the board to protect them from air currents, or may be swung back to permit free access to these instruments.

As described above, braking mechanism associated with the launching car is provided so that it will be brought to a stop after traveling a predetermined distance along the track. It is sometimes found that even though this braking mechanism functions the pull of the airplane is sufficient to overcome it, or, perhaps, to cause the car, plane and all, to nose down with ensuing wrecking. It is, therefore, sometimes found desirable to provide means whereby upon operation of the braking mechanism the engine is stopped. Apparatus adapted to so function is shown in Fig. 1.

Conductors 710 are carried by the car, which are adapted for attachment, by means of clips 711, to conductors, shown diagrammatically in Fig. 5 as attached to the "brake contacts", and designated by the numeral 712. These conductors 712 are connected in the ignition circuit, in parallel with the short-circuiting mechanism of the distance control so that closing of the brake contacts will cause short-circuiting of the ignition to stop the engine. The conductors 710 are attached to a normally open spring switch 713 which is mounted on the car frame adjacent the extension 714 carried by the eccentric 136. The switch 713 and extension 714 are so positioned, relatively, that actuation of the brake mechanism will cause closing of the switch to short-circuit the ignition. If the brake mechanism does not operate and the airplane leaves the launching car the clips 711 will pull away from the conductor 712 without in any way affecting the ignition circuit.

In an automatically controlled airplane, such as described, it is also found expedient to provide some means to overcome the propeller torque. A simple means of doing this is to offset the vertical fin 715.

Where an aerial torpedo is used the primary object, of course, is to drop a charge of explosive within the enemy's territory. It is quite desirable that mechanism be provided for preventing detonation of the explosive charge should the aerial torpedo for any reason land before crossing the enemy's land. A type of such mechanism is shown in Fig. 48.

This mechanism consists of distance control apparatus similar to that described above, the function thereof being to maintain the detonator ineffective until such distance has been traversed that the airplane has crossed the enemy's lines. As shown in Fig. 48, the air log 350ª, the counter mechanism 379ª, the valve block 370ª, the electrically operated valve 369ª, the equalizer 120ª and the generator 110ª, are the same as the corresponding parts described above in connection with the distance control. The counter mechanism is adapted, upon closing the contacts 403ª and 404ª to energize the solenoid 750. Movable within the solenoid is a spring pressed latch 751 adapted to cooperate with the firing pin 752 of the detonator 753 to normally hold that pin in inoperative position. Energizing of the solenoid will cause retraction of the latch 751, the secondary latch member 754 being adapted to lock the latch 751 in such retracted position.

The counter mechanism is set so that the solenoid 750 will not be energized until the aerial torpedo has traveled a sufficient distance to bring it over the enemy's territory. Until that distance has been traversed the detonator is inoperative. After the latch 751 is locked in retracted position the detonator is then effective to cause explosion of the explosive charge 755 wheresoever the torpedo may land.

It is readily seen that the control mechanism herein is in no way limited by the specific embodiment thereof described, that being merely a preferred embodiment, and used for illustrative purposes in disclosing the invention. And while this invention has been described in connection with a specific type of airplane, namely, an aerial torpedo, the control apparatus forming the subject matter thereof is capable of much broader application. For instance, the controls would also be entirely applicable to a marine torpedo, an "automobile torpedo" as it is commonly called, in which it is quite desirable that the movement of the torpedo be controlled according to some predetermined plan as to the direction of flight, as to the depth (that is to say, the altitude within the sustaining medium) at which the torpedo moves, and, in some cases, as for instance in strewing mines, the distance to which such torpedo or mine should travel. The control mechanisms described are also fully applicable to airships of the dirigible type, and in connection with passenger carrying airplanes. And this control apparatus would be desirable in connection with either a dirigible or heavier than air machine, even though used only to supplement the conventional manual controls. Furthermore, controls of this type would be effective in the steering of ocean going liners, and of submarines.

While the forms of mechanisms herein shown and described constitute preferred forms of embodiment of the invention, it is to be understood that other forms might be adopted, all coming within the scope of the claims which follow.

What I claim is as follows:

1. Controlling apparatus for a self-propelled vehicle, adapted for movement in a sustaining medium, comprising the combination with a propelling means, a rudder, and an elevator; of pneumatic means for operating said rudder to control the direction of flight of said vehicle, and a direction indicating mechanism for actuating said means; pneumatic means for operating said elevator to control the elevation of the vehicle in the sustaining medium; and means responsive to variations in altitude for actuating said elevator operating means; and pneumatic means associated with the propelling means for automatically stopping the operation of such propelling means after the vehicle has traveled a predetermined distance, said last-named means comprising an air distance recording wind wheel.

2. Controlling apparatus for a self-propelled vehicle, adapted for movement in a sustaining medium, comprising the combination with a propelling means, an elevator, and a rudder; of an equalizing reservoir; means tending to vary the pressure within said reservoir; pneumatic means, associated with said reservoir, adapted to operate said rudder to control the direction of movement of the vehicle, and means associated with said pneumatic means, and including a direction indicating mechanism for actuating said rudder operating means; other pneumatic means associated with said reservoir and adapted to operate the elevator to control the elevation of the vehicle in the sustaining medium, and means associated with such other pneumatic means, and including means responsive to variations in altitude, for actuating said elevator operating means; and another pneumatic means, associated with said reservoir, adapted to stop operation of the propelling means when the vehicle has traveled a predetermined distance, and actuating means associated with such last-named pneumatic means and including a distance indicating mechanism.

3. Controlling apparatus for a self-propelled vehicle adapted for movement in a sustaining medium, comprising the combination with a propelling means, an elevator, and a rudder; of an equalizer; suction means tending to create a vacuum in said equalizer; pneumatic means, associated with said equalizer adapted to operate said rudder to control the direction of movement of the vehicle, and means associated with said pneumatic means, and including a direction indicating mechanism, for actuating said rudder operating means; other pneumatic means associated with said equalizer and adapted to operate the elevator to control the elevation of the vehicle in the sustaining medium and means associated with such other pneumatic means, and including mechanism responsive to variations in altitude, for actuating said elevator operating means; and another pneumatic means associated with said equalier, adapted to stop operation of the propelling means when the vehicle has traveled a predetermined distance, and actuating means associated with such last-named means and including a distance indicating mechanism.

4. Controlling apparatus for a self-propelled vehicle, adapted for movement in a sustaining medium, comprising the combination with a propelling means, an elevator, and a rudder; of an equalizer; suction means associated with said propelling means and tending during operation to create a vacuum in said equalizer; pneumatic means, associated with said equalizer, adapted to operate said rudder to control the direction of movement of the vehicle, and means associated with said pneumatic means, and including direction indicating mechanism, for actuating said rudder operating means; other pneumatic means associated with said equalizer and adapted to operate the elevator to control the elevation of the vehicle in the sustaining medium, and means associated with such other pneumatic means, and including mechanism responsive to variations in altitude, for actuating said elevator operating means; and another pneumatic means associated with said equalizer adapted to stop operation of the propelling means when the vehicle has traveled a predetermined distance, and actuating means associated with such last-named means and including a distance indicating mechanism.

5. Controlling apparatus for a self-propelled vehicle, adapted for movement in a sustaining medium, comprising the combination with a propelling means, an elevator, and a rudder; of an equalizer associated with said propelling means, said propelling means during operation tending to create a vacuum within the equalizer; pneumatic means associated with said equalizer, adapted to operate said rudder to control the direction of movement of the vehicle, and means associated with said pneumatic means, and including direction indicating mechanism, for actuating said rudder operating means; other pneumatic means associated with said equalizer and adapted to operate the elevator to control the elevation of the vehicle in the sustaining medium, and means associated with such other pneumatic means, and including mechanism responsive to variations in altitude, for actuating said elevator operating means; and another pneumatic means associated with said equalizer adapted to stop operation of the propelling means when the vehicle has traveled a predetermined distance, and actuating means associated with such last-named means and including a distance indicating mechanism.

6. Controlling apparatus for a vehicle, adapted for movement in a sustaining medium, comprising the combination with an elevation controlling means; of an equalizer; suction means associated with said equalizer and tending to form a vacuum therein; pneumatic means associated with such equalizer and adapted to control said elevation controlling means; and means responsive to variations in the altitude of such vehicle within the sustaining medium for actuating said controlling means.

7. Controling apparatus for a vehicle, adapted for movment in a sustaining medium, comprising the combination with a propelling means and an elevator; of an equalizer; means associated with the propelling means and tending during operation thereof to form a vacuum in such equalizer; pneumatic means associated with such equalizer and adapted to control the elevator; and means responsive to variations in the altitude of said vehicle within the sustaining medium for actuating said pneumatic controlling means.

8. Controlling apparatus for a vehicle, adapted for movement in a sustaining medium, comprising the combination with a propelling means and an elevator; of an equalizer, associated with said propelling means, said propelling means during operation thereof tending to create a vacuum within said equalizer; pneumatic means associated with said equalizer and adapted to control the elevator; and means responsive to variations in the altitude of said vehicle within the sustaining medium for actuating said controlling means.

9. Controlling apparatus for a vehicle, adapted for movement in a sustaining medium, comprising the combination with a propelling means and an elevator; of an equalizer; means tending to create a vacuum within such equalizer; operating bellows operatively connected to said elevator; passages adapted to connect the interior of said bellows with the interior of the equalizer, a control valve within each passage, adapted to open or close the passage controled thereby; and means responsive to variations in the altitude of the vehicle within the sustaining medium for actuating said control valves.

10. Controlling apparatus for a vehicle, adapted for movement in a sustaining medium, comprising the combination with an elevator; of means for controlling movement of such elevator; actuating means for said controling means; altitude responsive means adapted to cause functioning of said actuating means; and means associated with said actuating means and said altitude responsive means for causing the actuating means to function less rapidly than the altitude responsive means.

11. Controlling apparatus for a vehicle, adapted for movement in a sustaining medium, comprising the combination with an elevator; of pneumatic means for operating the elevator; pneumatic relay mechanism for actuating said operating means including a valve; an electromagnet for operating said valve; and an altitude responsive mechanism controlling the flow of energizing current through said magnet, said magnet having incorporated therein integrating means whereby the operation of the relay valve is at a slower rate than the mechanism controlling the flow of current through the magnet.

12. Controlling apparatus for a vehicle, adapted for movement in a sustaining medium, comprising the combination with an elevator; of means for operating the elevator; and means for actuating said operating means, including mechanism responsive to pressure variations due to varying altitudes, and integrating means for causing the actuating means to function less rapidly than the pressure responsive mechanism.

13. Valve controlling apparatus comprising in combination; a valve; means for operating said valve; and means for actuating said operating means; said operating means including an integrating device whereby the valve is operated at a slower rate than the actuating means.

14. Controlling apparatus for a vehicle, adapted for movement in a sustaining medium, comprising the combination with an elevator; of pneumatic bellows for operating said elevator; a pneumatic relay device for actuating said bellows, said relay device including a balanced pneumatic and a valve carried thereby; an altimeter; and means controlled by said altimeter to cause functioning of the balanced pneumatic and the valve carried thereby.

15. Controlling apparatus for a vehicle, adapted for movement in a sustaining medium, comprising the combination with an elevator; of pneumatic bellows for operating said elevator; a pneumatic relay device for actuating said bellows, said relay device including a balanced pneumatic and a valve carried thereby; an altimeter; and means controlled by said altimeter to cause functioning of the balanced pneumatic and the valve carried thereby, said last-named means being integrated to cause slower movement of the valve than of the said altimeter.

16. In a gyroscope control apparatus, the combination of a gyroscope; a valve carried thereby; and a ported member positioned adjacent said valve and controlled thereby, said valve and ported member being so arranged that relative movement thereof may take place without resulting forces being set up tending to affect the gyroscope.

17. Controlling apparatus for a self-propelled vehicle comprising the combination with propelling means, including an internal-combustion motor; of means for automatically interrupting the ignition of the motor to stop the propelling means after the vehicle has traveled a predetermined distance, said ignition interrupting means including an air distance recording means independent of the propelling means.

18. Controlling apparatus for a self-propelled vehicle, comprising the combination with a propelling means, including an internal-combustion motor; of means for automatically interrupting the ignition of the motor to stop the propelling means after the vehicle has traveled a predetermined distance, said ignition interrupting means comprising an air log and a counter actuated thereby.

19. Controlling apparatus for a self-propelled vehi'*e, comprising the combination with a propelling means, including an internal-combustion motor; of an air log; pneumatic means actuated by said air log; and a distance counter operated by said pneumatic means and adapted after a predetermined distance has been registered thereby to interrupt the ignition circuit of the motor to stop the propelling means.

20. Controlling apparatus for a self-propelled vehicle, comprising the combination with a propelling means, including an internal-combustion motor; of an air log; pneumatic means actuated by said air log; and a subtraction distance counter operated by said pneumatic means and adapted after a predetermined distance has been registered thereby to interrupt the ignition circuit of the motor to stop the propelling means.

21. In a self-propelled vehicle, the combination of pneumatically operated mechanism for controlling movement of the vehicle; and propelling means for the vehicle, said means comprising an internal combustion motor, said motor also directly producing the pressure difference for actuating the pneumatic control mechanism.

22. In a self-propelled vehicle, the combination of vacuum-pneumatic mechanism for controlling movement of the vehicle; and a propelling means for the vehicle, said means comprising a two-cycle internal-combustion motor having the vacuum-pneumatic mechanism connected to the crank case of the motor.

23. In a self-propelled vehicle, the combination of vacuum-pneumatic mechanism for controlling the movement of the vehicle, propelling means for the vehicle, said means comprising an internal-combustion motor, adapted to cause operation of the vacuum-pneumatic means; and an equalizer associated with the motor and the control mechanism.

24. In a self-propelled vehicle, the combination of vacuum-pneumatic mechanism for controlling the movement of the vehicle; propelling means for the vehicle, comprising a two-cycle internal-combustion motor; means connecting the vacuum-pneumatic mechanism to the crank case of the motor; an equalizer interposed between the crank case and the vacuum-pneumatic mechanism; and a valve interposed between the equalizer and the crank case and adapted to connect the equalizer and crank case only at such time as a vacuum exists within said crank case.

25. Controlling apparatus for a vehicle including: a steering means, a self directing means movably supported by said vehicle upon substantially frictionless supports, a valve having a port located in proximity to but out of contact with said movable directing means so that relative movement of the vehicle and directing means varies the effective opening of the port, and mechanism actuated by said valve to operate the steering means.

26. In a controlling apparatus, in combination, a self directing means movably supported upon its support, a valve having a port positioned adjacent said directing means but out of contact therewith, a member carried by said directing means and so arranged that relative movement of the directing means and said valve will control the effective opening through said port while remaining free of actual contact therewith.

27. In a controlling apparatus, in combination, a compass means rotatably supported upon a substantially frictionless support; a member rotatable by said compass means, a valve having a port positioned adjacent said member but out of contact therewith, and so arranged that relative movement of the valve and said member will control the effective opening through said port.

28. In combination, a movable element, a control surface for turning said element about an axis, means responsive to fluid pressure for moving said surface, a valve for controlling the admission of fluid to said means, a movable member connected to said valve, a gyroscope, a pair of nozzles adjacent said gyroscope, a fluid pressure means connected to said nozzles, means connected to said gyroscope for covering said nozzles when said element is in a predetermined position with respect to said axis and for uncovering one or the other of said nozzles when said element turns in one direction or the other from said position, and means responsive to the uncovering of either of said nozzles for moving said member in a corresponding direction to actuate said valve.

29. In an automatic stabilizer for aircraft, in combination, a balancing rudder and means for automatically moving said rudder to stabilize said aircraft in flight including: a pneumatic motor having a controlling valve comprising two cooperating but independently movable parts, the first of said parts being actuated by gravity and the tilting of the aircraft to cause said motor to move to correct the tilted position of the aircraft, and the second of said parts being actuated by said correcting movement of the motor to counteract the effect of the prior movement of said first part.

30. In an automatic stabilizer for aircraft, in combination, a balancing rudder and means for automatically moving said rudder to stabilize said aircraft in flight including: a pneumatic motor having a controlling valve actuated by gravity and the tilting of the aircraft to cause said motor to move to correct the tilted position of the aircraft, and neutralizing means actuated by said movement of the pneumatic motor to neutralize the changed position of said controlling valve.

31. In an automatic stabilizer for vehicles, in combination, a balancing rudder and means for automatically operating said rudder to stabilize the vehicle in flight, said means including a pneumatic motor, an air conduit leading to said motor, a gravity operated valve in said conduit automatically actuated by the tilting of the vehicle to cause said motor to move to correct the tilted position of the vehicle, and means mechanically actuated by said movement of the pneumatic motor to bring said gravity valve toward neutral position.

In testimony whereof I affix my signature.

CHARLES F. KETTERING.